(12) United States Patent
Zhong et al.

(10) Patent No.: US 11,971,089 B2
(45) Date of Patent: Apr. 30, 2024

(54) TWO-SPEED TRANSMISSION SYSTEM AND VEHICLE

(71) Applicant: Huawei Digital Power Technologies Co., Ltd., Shenzhen (CN)

(72) Inventors: Hu Zhong, Shanghai (CN); Xueyu Mei, Shanghai (CN); Huan Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 151 days.

(21) Appl. No.: 17/706,299

(22) Filed: Mar. 28, 2022

(65) Prior Publication Data

US 2022/0307572 A1 Sep. 29, 2022

(30) Foreign Application Priority Data

Mar. 26, 2021 (CN) .......................... 202110327070.8

(51) Int. Cl.
| | |
|---|---|
| *F16H 3/091* | (2006.01) |
| *B60K 17/08* | (2006.01) |
| *F16H 3/10* | (2006.01) |
| *F16H 57/00* | (2012.01) |

(52) U.S. Cl.
CPC ............. *F16H 3/091* (2013.01); *B60K 17/08* (2013.01); *F16H 3/10* (2013.01); *F16H 57/0025* (2013.01); *F16H 2200/0034* (2013.01)

(58) Field of Classification Search
CPC ........ F16H 3/091; F16H 3/10; F16H 57/0025; F16H 2200/0034; B60K 17/08
See application file for complete search history.

(56) References Cited

U.S. PATENT DOCUMENTS

| 11,181,173 B1 * | 11/2021 | Park ...................... B60K 17/02 |
| 2020/0347916 A1 | 11/2020 | Sung et al. |

FOREIGN PATENT DOCUMENTS

| CN | 201992007 U | 9/2011 |
|---|---|---|
| CN | 103511561 A | 1/2014 |
| CN | 103573856 A | 2/2014 |
| CN | 104089005 A | 10/2014 |
| CN | 106481745 A | 3/2017 |
| CN | 104875599 B | 9/2017 |

(Continued)

*Primary Examiner* — Terence Boes
(74) *Attorney, Agent, or Firm* — Leydig, Voit & Mayer, Ltd.

(57) ABSTRACT

This application provides a two-speed transmission system. The two-speed transmission system includes a first fixed gear fastened on a first shaft, a first floating gear connected to a second shaft through rotation, a first connection mechanism, and a one-way clutch. The first connection mechanism is configured to implement connection or disconnection between the first floating gear and the second shaft. The one-way clutch is located between the first floating gear and the first connection mechanism. An inner surface of the one-way clutch is connected to the first floating gear. An outer surface of the one-way clutch abuts against the first connection mechanism. The outer surface of the one-way clutch is connected to the first connection mechanism. An acting force of the outer surface directly acts on the first connection mechanism instead of a tooth surface of the first floating gear, to reduce an impact on accuracy of gear transmission.

8 Claims, 23 Drawing Sheets

(56) References Cited

FOREIGN PATENT DOCUMENTS

| CN | 108194583 | A | 6/2018 |
|----|-----------|---|--------|
| CN | 109340361 | A | 2/2019 |
| CN | 109723769 | A | 5/2019 |
| CN | 209159421 | U | 7/2019 |
| CN | 110513445 | A | 11/2019 |
| CN | 211951345 | U | 11/2020 |
| GB | 692607    | A | 6/1953 |

* cited by examiner

TWO-SPEED TRANSMISSION SYSTEM AND VEHICLE

CROSS-REFERENCE TO RELATED APPLICATIONS

This application claims priority to Chinese Patent Application No. 202110327070.8, filed on Mar. 26, 2021, which is hereby incorporated by reference in its entirety.

TECHNICAL FIELD

This application relates to the field of power transmission technologies, and in particular, to a two-speed transmission system and a vehicle.

BACKGROUND

In comparison with a conventional fuel vehicle, a structure of a pure electric vehicle has a relatively large change. Without an engine and an exhaust system, a complex gearbox becomes a current single-gear reduction gearbox. To enable a motor to work highly efficiently as much as possible and reduce energy consumption, a pure electric two-gear gearbox is also widely studied and applied. However, a gear shift mechanism such as a synchronizer is added to the two-gear gearbox in comparison with a one-gear gearbox. During gear shift, power interruption occurs in a process in which the synchronizer is disengaged from a first gear and engages with a second gear, that is, a vehicle jerk.

To reduce power interruption, a one-way clutch is generally used in the gear shift mechanism. The one-way clutch is usually installed between a gear tooth surface and a shaft interface of a first floating gear in one-way power transmission. The one-way clutch only allows a power source to rotate in one direction to transmit a torque to a driven component. If a rotation direction of the power source changes (for example, from a clockwise direction to a counter-clockwise direction), the driven component is divorced from a transmission relationship with the power source under the function of the one-way clutch. In other words, the power source does not transmit the torque to the driven component. As shown in FIG. 4, in the conventional technologies, at a first gear, a one-way clutch 400 is connected between a gear tooth surface 201 and a shaft interface 202 of a first floating gear 200, the gear tooth surface 201 of the first floating gear 200 engages with a first fixed gear 100, and the gear tooth surface 201 may rotate relative to the shaft interface 202 in a direction. When the first fixed gear 100 rotates in another direction, the gear tooth surface 201 and the shaft interface 202 are relatively static, to implement differential rotation between the gear tooth surface 201 and the shaft interface 202. Therefore, this may be applied to a speed change process when the first gear is switched to a second gear, to avoid power interruption. However, in a transmission system shown in FIG. 4, a first-gear power transmission path is an input shaft 21, the first fixed gear 100, the gear tooth surface 201, the one-way clutch 400, and the shaft interface 202. In this case, the one-way clutch 400 is locked to generate an acting force on the gear tooth surface 201, and the first fixed gear 100 and the gear tooth surface 201 are engaged more tightly, affecting accuracy of gear transmission.

SUMMARY

This application provides a two-speed transmission system, to improve accuracy of gear transmission.

According to a first aspect, this application provides a two-speed transmission system. The two-speed transmission system includes: a first fixed gear, sleeved on a first shaft and fixedly connected to the first shaft; a first floating gear, sleeved on a second shaft, where the first floating gear can rotate relative to the second shaft, and the first fixed gear and the first floating gear are permanently engaged; a first connection mechanism, fastened on the second shaft and configured to implement connection or disconnection between the first floating gear and the second shaft; and a one-way clutch, where the one-way clutch is located between the first floating gear and the first connection mechanism; an inner surface of the one-way clutch is connected to the first floating gear; an outer surface of the one-way clutch abuts against the first connection mechanism; when the first floating gear rotates relative to the first connection mechanism in a rotation direction, the first floating gear and the first connection mechanism can implement differential rotation by using the one-way clutch; and when the first floating gear rotates relative to the first connection mechanism in another rotation direction, the one-way clutch is locked so that the first floating gear and the first connection mechanism are relatively static and rotate at a same rotation speed to transmit first-gear power.

This application provides the two-speed transmission system. When the one-way clutch is in a connected state, a power transmission path of the first shaft is sequentially the first shaft, the first fixed gear, the first floating gear, the one-way clutch, the first connection mechanism, and the second shaft. The outer surface of the one-way clutch is connected to the first connection mechanism. An acting force of the outer surface directly acts on the first connection mechanism instead of a tooth surface between the first floating gear and the first fixed gear, to avoid the following case: Accuracy of gear transmission between the first fixed gear and the first floating gear is affected because the first fixed gear and the first floating gear are engaged more tightly due to the acting force of the one-way clutch. When the one-way clutch is in the connected state, the first connection mechanism may further be connected to the second shaft and the first floating gear, to avoid affecting power transmission when the one-way clutch is unstably connected in a fluctuation process.

In an embodiment, the first fixed gear is not limited to be fastened on the first shaft in a key manner, a welding manner, or an integrated forming manner. The key includes a flat key or a spline.

In an embodiment, when the one-way clutch is in the connected state, the outer surface of the one-way clutch abuts against the first connection mechanism, and the outer surface of the one-way clutch and the first connection mechanism are relatively fixed and cannot rotate relative to each other. When the one-way clutch is in a disconnected state, the outer surface of the one-way clutch abuts against the first connection mechanism, but the one-way clutch and the first connection mechanism can rotate relative to each other and are not fully fastened or locked. In some implementations, when the one-way clutch is in the disconnected state, the outer surface of the one-way clutch abuts against the first connection mechanism, and the outer surface of the one-way clutch and the first connection mechanism are relatively fixed. However, the outer surface and the inner surface of the one-way clutch can rotate relative to each other, to implement differential rotation between a component on the outer surface side and a component on the inner surface side.

In an embodiment, the one-way clutch may be one of a roller-type one-way clutch and a wedge-type one-way clutch.

In an embodiment, a housing is further disposed outside the two-speed transmission system. The housing can be used to protect the two-speed transmission system or can be used as a support carrier for some components in the two-speed transmission system. For example, the first shaft and the second shaft may be supported on the housing by using a connection apparatus.

In an embodiment, the first floating gear includes a first floating transmission tooth surface and a first floating connection part. The first floating transmission tooth surface is disposed away from the second shaft relative to the first floating connection part. The first floating transmission tooth surface is configured to engage with the first fixed gear. The first floating connection part is configured to connect to the second shaft through rotation to connect the first floating gear to the second shaft through rotation. The first floating connection part includes a first extension part extending in an axial direction of the second shaft. The inner surface of the one-way clutch is sleeved on a surface of the first extension part and away from the second shaft and is fixedly connected to the first extension part. The inner surface of the one-way clutch is connected to the first floating gear.

In an embodiment, the first floating connection part may be connected to the second shaft through rotation by using a bearing.

In an embodiment, the first connection mechanism includes a gear hub fixedly connected to the second shaft. The gear hub includes a gear hub connection part and a second extension part. The second extension part is disposed away from the second shaft relative to the gear hub connection part. The second extension part extends in an opposite direction of an extension direction of the first extension part. The second extension part is sleeved on the outer surface of the one-way clutch and abuts against the outer surface of the one-way clutch. The outer surface of the one-way clutch abuts against the first connection mechanism.

In an embodiment, the first floating gear further includes a first gear shift ring. The first gear shift ring is configured to connect to or disconnect from the first connection mechanism.

In an embodiment, the first floating gear further includes a first transmission connection part located between the first floating transmission tooth surface and the first floating connection part. The first transmission connection part is located at an end of the first floating connection part away from the first extension part. The first gear shift ring is located on the first transmission connection part. The first gear shift ring extends in the same direction as the first extension part. An end of the first gear shift ring away from the first transmission connection part is connected to or disconnected from the first connection mechanism.

In an embodiment, the first connection mechanism further includes a sliding mechanism and a shifting fork. The sliding mechanism is sleeved on an outer surface of the gear hub and can slide in the axial direction of the second shaft. The shifting fork is connected to the sliding mechanism and can control the sliding mechanism to move in the axial direction of the second shaft. The sliding mechanism includes a second gear shift ring matching the first gear shift ring. The first gear shift ring and the second gear shift ring can be controlled to be engaged or separated when the shafting fork slides in the axial direction of the second shaft, to implement connection and disconnection between the first connection mechanism and the first floating gear.

In an embodiment, a sliding sleeve away from the second shaft is disposed on the sliding mechanism. The sliding sleeve is sleeved on an outer surface of the sliding mechanism and is fixedly connected to the sliding mechanism. A shifting fork groove is disposed in the sliding sleeve, and the shifting fork is disposed in the shifting fork groove. When the shifting fork is flexibly connected to the sliding mechanism, the shifting fork groove may limit the shifting fork to be in the shifting fork groove. The shifting fork groove may be a "U"-shaped groove. When an external force acts on the shifting fork, the shifting fork abuts against a groove wall of the shifting fork groove, to push the sliding mechanism to move in the axial direction of the second shaft 30.

In an embodiment, a tooth surface of the first gear shift ring and a tooth surface of the second gear shift ring are perpendicular to the axial direction of the second shaft. A shape of a tooth part in the first gear shift ring and that in the second gear shift ring are not limited to one of a rectangle, a trapezoid, or a square.

In an embodiment, the first shaft is an input shaft, the second shaft is an intermediate shaft, the first fixed gear is a first driving gear, and the first floating gear is a first driven gear; or the first shaft is an intermediate shaft, the second shaft is an input shaft, the first fixed gear is a first driven gear, and the first floating gear is a first driving gear.

In an embodiment, the two-speed transmission system further includes:

a second fixed gear, sleeved on a fixed shaft and fixedly connected to the fixed shaft, where the fixed shaft is one of the first shaft and the second shaft;

a second floating gear, sleeved on a floating shaft, where the second floating gear can rotate relative to the floating shaft, the second fixed gear and the second floating gear are permanently engaged, and the floating shaft is the other one of the first shaft and the second shaft; and a second connection mechanism, fastened on the floating shaft and configured to implement connection or disconnection between the second floating gear and the floating shaft, where when the second floating gear and the floating shaft are connected by using the second connection mechanism; the second floating gear and the floating shaft rotate at a same rotation speed; and when the second floating gear and the floating shaft are disconnected by using the second connection mechanism, a rotation speed of the floating shaft is not controlled by the second floating gear.

In an embodiment, the second fixed gear is not limited to be fastened on the first shaft in a key manner, a welding manner, or an integrated forming manner. The key includes a flat key or a spline.

In an embodiment, the fixed shaft is the first shaft and is the input shaft, the floating shaft is the second shaft and is the intermediate shaft, the second fixed gear is a second driving gear, and the second floating gear is a second driven gear; or the fixed shaft is the first shaft and is the intermediate shaft, the floating shaft is the second shaft and is the input shaft, the second fixed gear is a second driven gear, and the second floating gear is a second driving gear; or the fixed shaft is the second shaft and is the intermediate shaft, the floating shaft is the first shaft and is the input shaft, the second fixed gear is a second driven gear, and the second floating gear is a second driving gear; or the fixed shaft is the second shaft and is the input shaft, the floating shaft is the first shaft and is the intermediate shaft, the second fixed gear is a second driving gear, and the second floating gear is a second driven gear.

In an embodiment, the second floating gear includes a second floating transmission gear part and a second floating hollow shaft. The second floating transmission gear part and the second fixed gear are engaged. The second floating hollow shaft is sleeved outside the floating shaft and is connected to the floating shaft through rotation. The second connection mechanism is connected to the second floating hollow shaft.

In an embodiment, the second connection mechanism is a friction clutch. The friction clutch includes a first rotation shaft interface, a second rotation interface, and a plurality of friction plates. The first rotation shaft interface is fixedly connected to an outer surface of the second floating hollow shaft away from the floating shaft. The second rotation interface is fixedly connected to the floating shaft. The friction clutch controls connection and disconnection between the second floating gear and the floating shaft through connection and disconnection between the plurality of friction plates.

In an embodiment, the friction clutch further includes a fastening screw. The fastening screw is fastened on the floating shaft in an axial direction of the floating shaft, to fixedly connect the friction clutch to the floating shaft.

According to a second aspect, this application provides a vehicle. The vehicle includes front wheels, rear wheels, a vehicle body connected between the front wheels and the rear wheels, and the two-speed transmission system according to any one of the first aspect and the possible implementations. The two-speed transmission system is installed on the vehicle body. The vehicle includes a car, an electric vehicle, or a special working vehicle. The electric vehicle includes a two-wheel, three-wheel, or four-wheel electric vehicle. The special working vehicle includes various vehicles having specific functions, for example, an engineering emergency vehicle, a water spraying vehicle, a suction sewage truck, a cement mixer vehicle, a carriage hoist, and a medical vehicle.

BRIEF DESCRIPTION OF DRAWINGS

To describe technical solutions in embodiments of this application more clearly, the following describes the accompanying drawings required for embodiments in this application.

DESCRIPTION OF EMBODIMENTS

The following describes technical solutions in embodiments of this application with reference to the accompanying drawings in embodiments of this application. It is clear that the described embodiments are merely some rather than all of embodiments of this application.

The terms "first", "second", and the like in this specification are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise specified, "a plurality of" means two or more than two.

In addition, in this specification, position terms such as "top" and "bottom" are defined relative to positions of structures in the accompanying drawings. It should be understood that these position terms are relative concepts used for relative description and clarification, and may correspondingly change according to changes in the positions of the structures.

Figure 1:
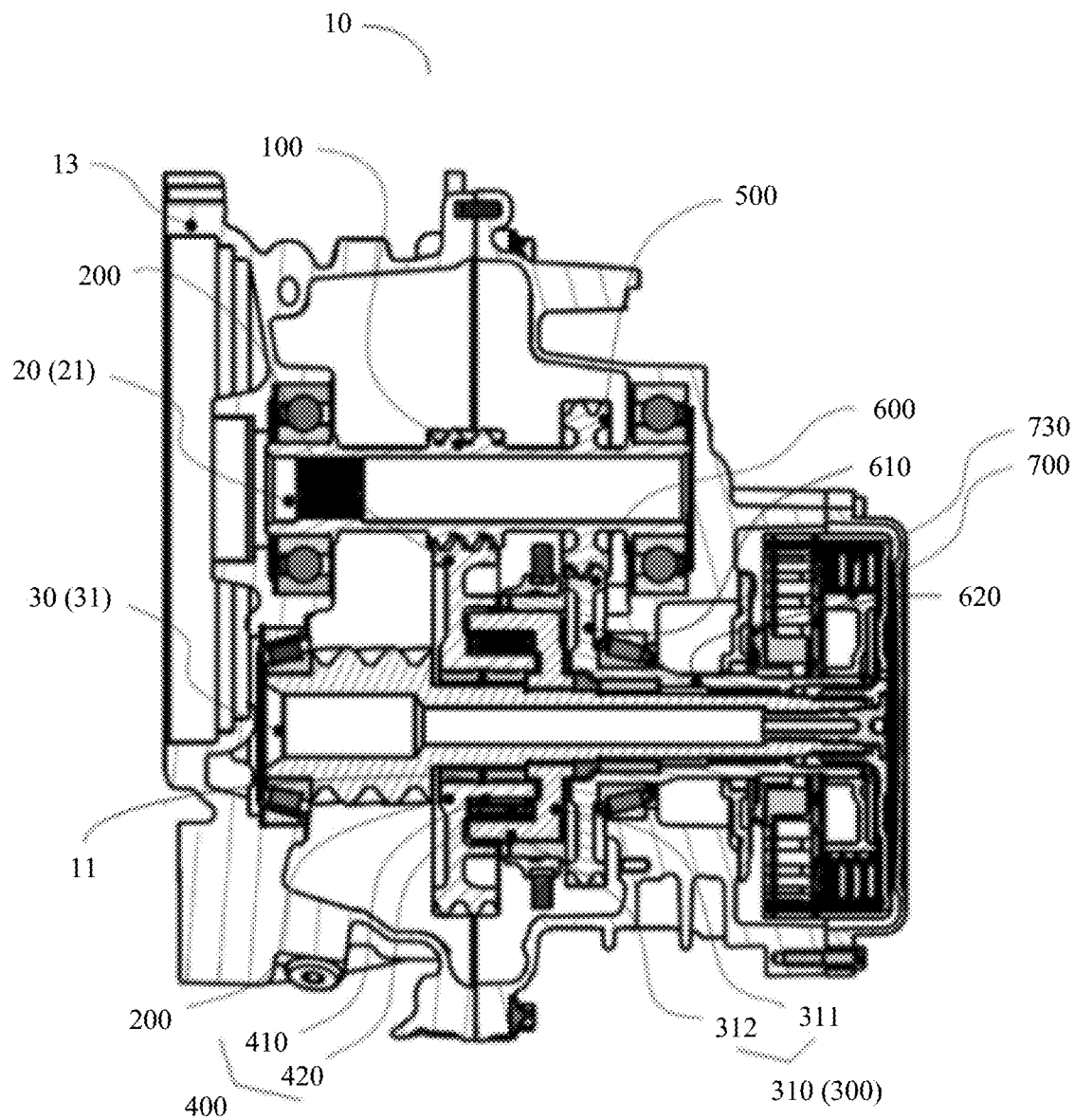
FIG. 1 is a schematic diagram of a structure of a two-speed transmission system according to an embodiment of this application.

With reference to FIG. 1, an embodiment of this application provides a two-speed transmission system 10. The two-speed transmission system 10 includes a first shaft 20, a second shaft 30, a first fixed gear 100, a first floating gear 200, a first connection mechanism 300, a one-way clutch 400, a second fixed gear 500, a second floating gear 600, and a second connection mechanism 700. The first fixed gear 100, the first floating gear 200, the first connection mechanism 300, and the one-way clutch 400 are components that can be used to transmit first-gear power. The second fixed gear 500, the second floating gear 600, and the second connection mechanism 700 are components that can be used to transmit second-gear power.

The first shaft 20 may be one of an input shaft 21 and an intermediate shaft 31. The second shaft 30 is the other one of the input shaft 21 and the intermediate shaft 31. The input shaft 21 is configured to connect to a drive motor. The drive motor drives the input shaft 21 to rotate. A gear located on the input shaft 21 is a driving gear, and a gear located on the intermediate shaft 31 is a driven gear. The driven gear and the driving gear are engaged, so that the input shaft 21 drives the intermediate shaft 31 to rotate.

The first fixed gear 100 is sleeved on the first shaft 20 and fixedly connected to the first shaft 20. In this embodiment, the first shaft 20 is the input shaft 21, and the first fixed gear 100 is a first driving gear. The first fixed gear 100 is not limited to be fastened on the first shaft 20 in a key manner, a welding manner, and an integrated forming manner. The key includes a flat key or a spline.

The first floating gear 200 is sleeved on the second shaft 30 and can rotate relative to the second shaft 30. In other words, the first floating gear 200 idles relative to the second shaft 30 in a floating manner. The first fixed gear 100 and the first floating gear 200 are permanently engaged. In this embodiment, the second shaft 30 is the intermediate shaft 31, the first floating gear 200 is a first driven gear, and the first floating gear 200 is sleeved on the second shaft 30. It indicates that the first floating gear 200 is not fixed on the second shaft 30, and differential rotation may be implemented between the first floating gear 200 and the second shaft 30. Specifically, the first floating gear 200 is connected to the second shaft 30 through rotation by using a bearing 11. The first fixed gear 100 and the first floating gear 200 are permanently engaged. When the two-speed transmission system 10 is at a first gear, power of the first shaft 20 (the input shaft 21) is transmitted to the second shaft 30 (the intermediate shaft 31), to transmit the first-gear power.

The first connection mechanism 300 is fastened on the second shaft 30 and configured to implement connection or disconnection between the first floating gear 200 and the second shaft 30. In this embodiment, the second shaft 30 is the intermediate shaft 31, the first connection mechanism 300 is fixedly connected to the intermediate shaft 31, and the first connection mechanism 300 is not limited to be fastened on the intermediate shaft 31 in a key manner, a welding manner, and an integrated forming manner. The key includes a flat key or a spline. When the first connection mechanism 300 is connected to the first floating gear 200 and the second shaft 30 (the intermediate shaft 31), the first floating gear 200 and the second shaft 30 (the intermediate shaft 31) can rotate only at the same speed. A power transmission path is sequentially the first shaft 20 (the input shaft 21), the first fixed gear 100, the first floating gear 200, the first connection mechanism 300, and the second shaft 30 (the intermediate shaft 31).

Figure 2:
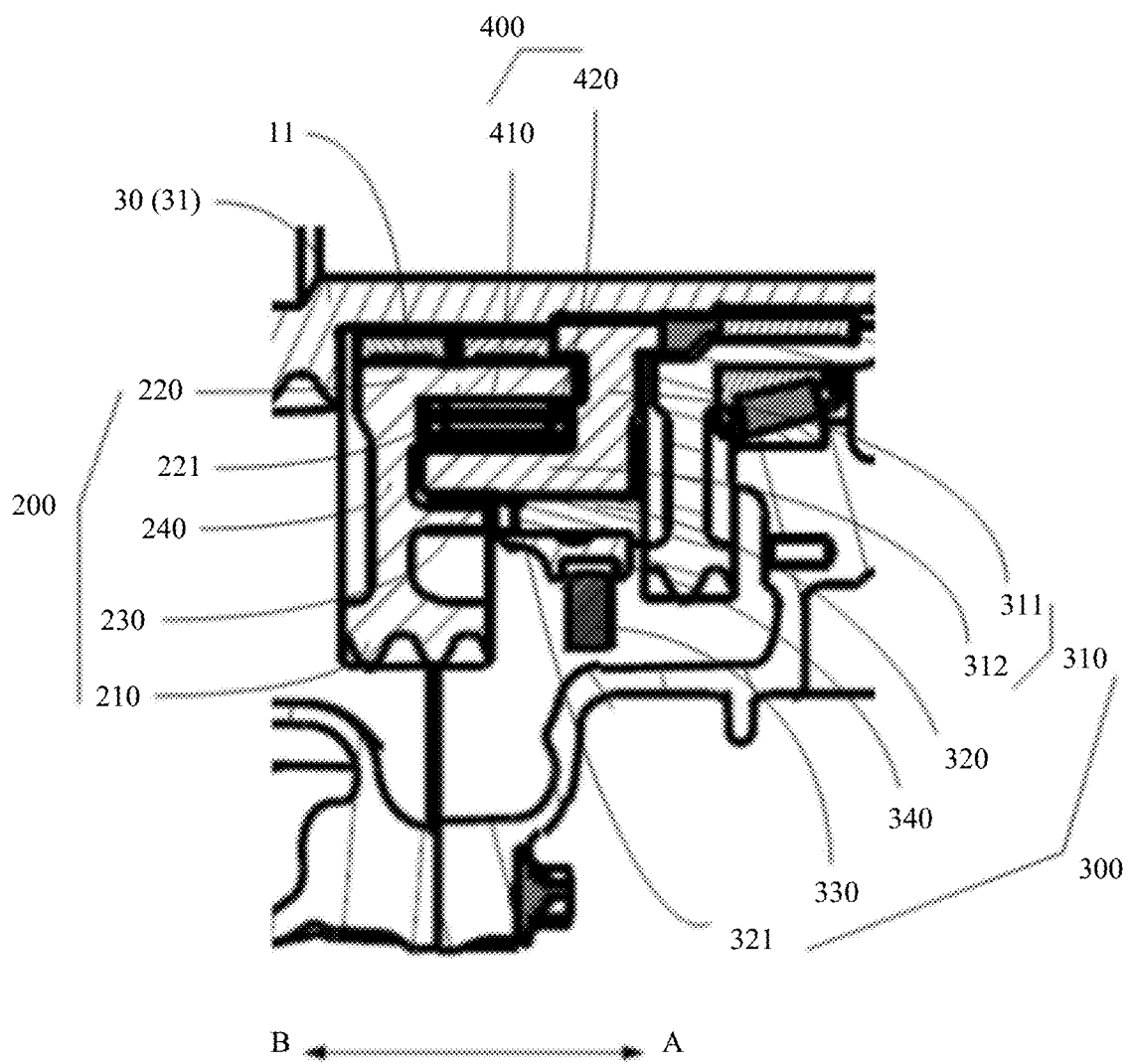
FIG. 2 is a schematic diagram of a local structure of a two-speed transmission system according to an embodiment of this application.
Figure 3:
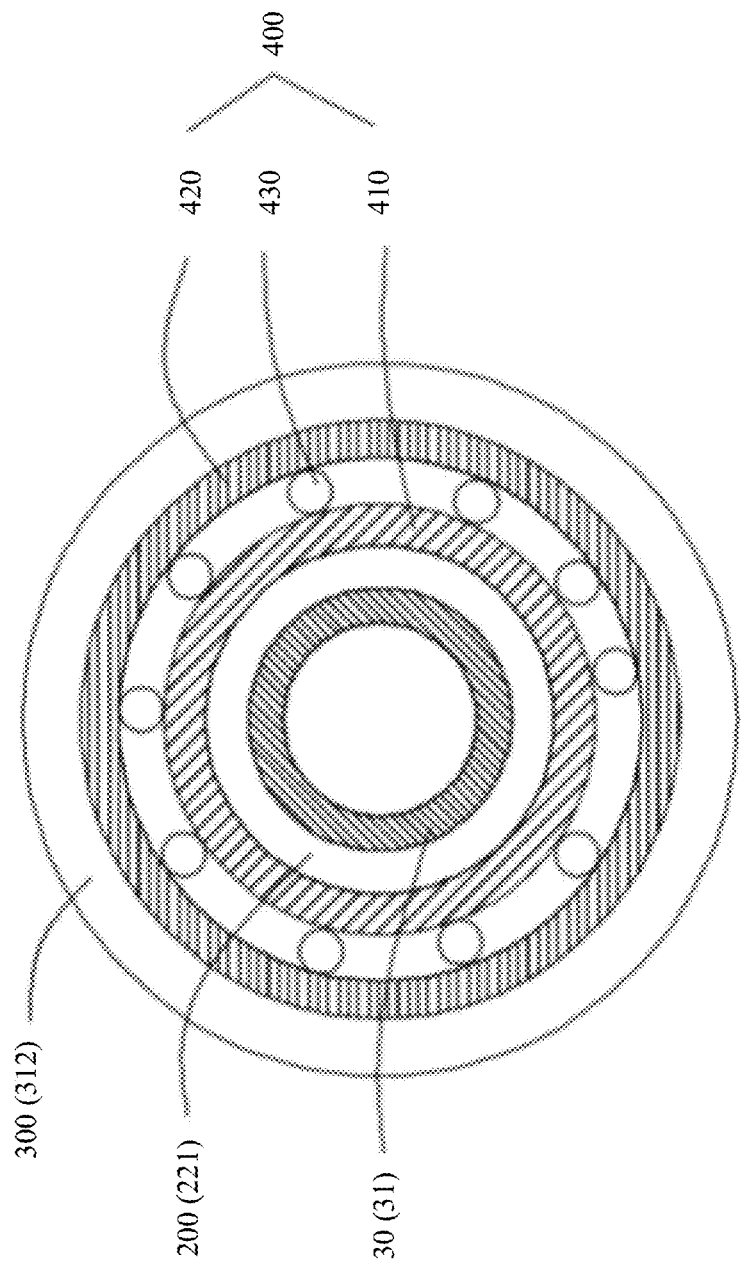
FIG. 3 is a schematic diagram of positions of a first connection mechanism, a first floating gear, a one-way clutch, and a second shaft in a two-speed transmission system according to an embodiment of this application.

The one-way clutch 400 is located between the first floating gear 200 and the first connection mechanism 300 (as shown in FIG. 2 and FIG. 3). An inner surface 410 of the one-way clutch 400 is connected to the first floating gear 200, and an outer surface 420 of the one-way clutch 400 abuts against the first connection mechanism 300. The one-way clutch 400 has a disconnected state and a connected state. When the one-way clutch 400 is in the disconnected state, a component on the outer surface 420 side of the one-way clutch 400 can rotate relative to a component on the inner surface 410 side in a direction. When the one-way clutch 400 is in the connected state, the outer surface 420 rotates in another direction. A component on the inner surface 410 side and a component on the outer surface 420 side are fixed and relatively static. In this case, the component on the outer surface 420 side and the component on the inner surface 410 side rotate in the same direction. In the one-way clutch 400 shown in FIG. 3, when the outer surface 420 rotates in a clockwise direction, the first connection mechanism 300 on the outer surface 420 side may rotate relative to the first floating gear 200 on the inner surface 410 side, and the first floating gear 200 on the inner surface 410 side may not rotate or rotate at a rotation speed less than a rotation speed of the first connection mechanism 300 on the outer surface 420 side. In this case, the one-way clutch 400 is in the disconnected state. When the outer surface 420 rotates in a counterclockwise direction, the first connection mechanism 300 on the outer surface 420 side and the first floating gear 200 on the inner surface 410 side are fixed and relatively static. In this case, the first floating gear 200 on the inner surface 410 side and the first connection mechanism 300 on the outer surface 420 side rotate in the counterclockwise direction together. In this case, the one-way clutch 400 is in the connected state. In some embodiments, alternatively, in the one-way clutch 400, when the outer surface 420 rotates in the clockwise direction, a component on the outer surface 420 side and a component on the inner surface 410 side are relatively static. When the outer surface 420 rotates in the counterclockwise direction, a component on the outer surface 420 side and a component on the inner surface 410 side rotate relative to each other.

When the one-way clutch 400 is in the connected state, the outer surface 420 of the one-way clutch 400 abuts against the first connection mechanism 300, and the outer surface 420 of the one-way clutch 400 and the first connection mechanism 300 are relatively fixed and cannot rotate relative to each other. A specific implementation structure may be disposed based on the specific one-way clutch 400, for example, may be implemented by using a locking component 430 (as shown in FIG. 3). When the one-way clutch 400 is in the disconnected state, the outer surface 420 of the one-way clutch 400 abuts against the first connection mechanism 300, but the outer surface 420 of the one-way clutch 400 and the first connection mechanism 300 can rotate relative to each other and are not fully fastened or locked. In some embodiments, when the one-way clutch 400 is in the disconnected state, the outer surface 420 of the one-way clutch 400 abuts against the first connection mechanism 300, and the outer surface 420 of the one-way clutch 400 and the first connection mechanism 300 are relatively fixed. However, the outer surface 420 and the inner surface 410 of the one-way clutch 400 can rotate relative to each other, to implement differential rotation between the component on the outer surface 420 side and the component on the inner surface 410 side.

The first floating gear 200 is a component on the outer surface 420 side of the one-way clutch 400. The first connection mechanism 300 is a component on the inner surface 410 side of the one-way clutch 400. When the first floating gear 200 rotates relative to the first connection mechanism 300 in a rotation direction, the first floating gear 200 and the first connection mechanism 300 can implement differential rotation. When the first floating gear 200 rotates relative to the first connection mechanism 300 in another rotation direction, the one-way clutch 400 is locked so that the first floating gear 200 and the first connection mechanism 300 are relatively static and rotate at the same rotation speed to transmit the first-gear power.

Figure 4:
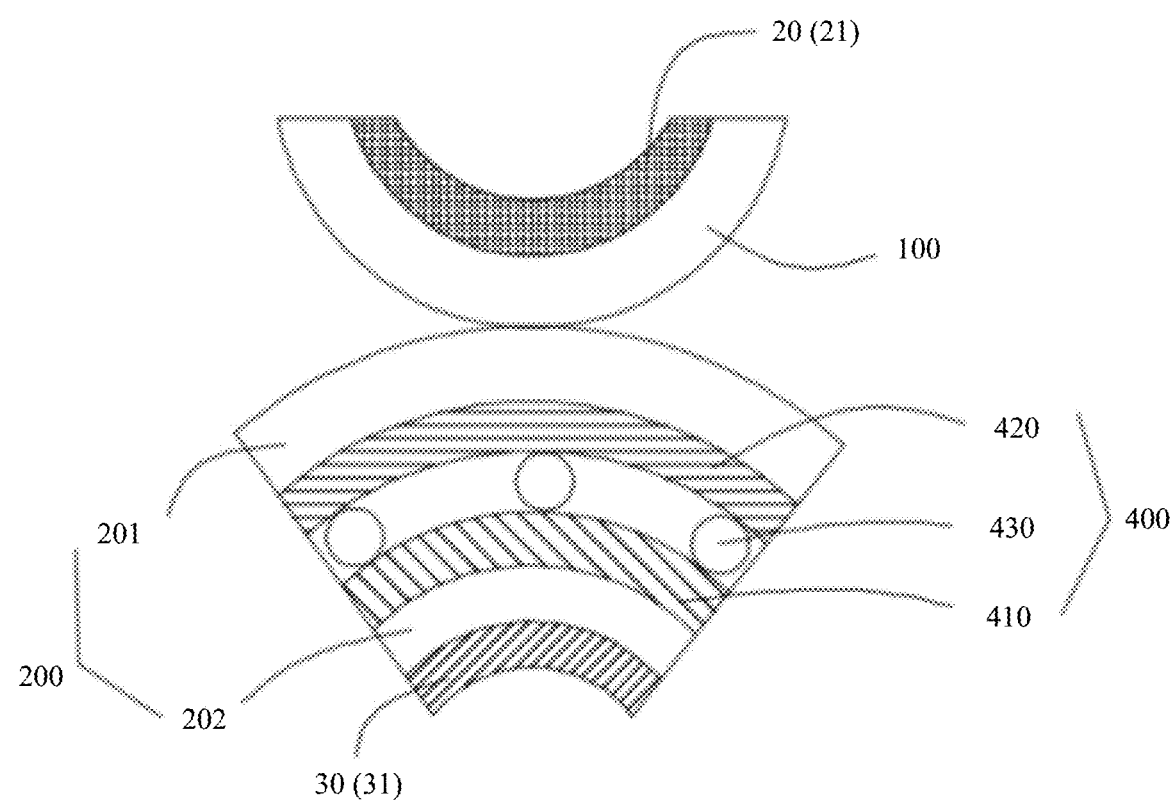
FIG. 4 is a schematic diagram of positions of a first floating gear, a one-way clutch, and a second shaft in the conventional technologies.

In the conventional technologies, as shown in FIG. 4, the inner surface 410 of the one-way clutch 400 is fixed in the first floating gear 200. The outer surface 420 abuts against a gear tooth surface 201 of the first floating gear 200. The inner surface is fastened on the shaft interface 202 of the first floating gear 200. When the one-way clutch 400 is in the connected state, a power transmission path of the first shaft 20 (the input shaft 21) is sequentially the first shaft 20 (the input shaft 21), the first fixed gear 100, the gear tooth surface 201, the one-way clutch 400, the shaft interface 202, and the second shaft 30 (the intermediate shaft 31). Power of the first floating gear 200 is directly transmitted to the outer surface 420. The outer surface 420 also has a reaction force to the first floating gear 200. The first floating gear 200 and the first fixed gear 100 are engaged more tightly due to the reaction force, affecting accuracy of gear transmission between the first fixed gear 100 and the first floating gear 200.

In this embodiment, still with reference to FIG. 1, when the one-way clutch 400 is in the connected state, a power transmission path of the first shaft 20 (the input shaft 21) is sequentially the first shaft 20 (the input shaft 21), the first fixed gear 100, the first floating gear 200, the one-way clutch 400, the first connection mechanism 300, and the second shaft 30 (the intermediate shaft 31). The outer surface 420 of the one-way clutch 400 is connected to the first connection mechanism 300. An acting force of the outer surface 420 directly acts on the first connection mechanism 300 instead of a tooth surface between the first floating gear 200 and the first fixed gear 100, to avoid the following case: The accuracy of gear transmission between the first fixed gear 100 and the first floating gear 200 is affected because the first fixed gear 100 and the first floating gear 200 are engaged more tightly due to the acting force of the one-way clutch 400. When the one-way clutch 400 is in the connected state, the first connection mechanism 300 may further be connected to the second shaft 30 and the first floating gear 200, to avoid affecting power transmission when the one-way clutch 400 is unstably connected in a fluctuation process.

The one-way clutch 400 further includes a locking component 430 (as shown in FIG. 3). The locking component 430 is configured to keep the one-way clutch 400 in the connected state. A specific structure of the locking component 430 is not limited in this application, provided that the one-way clutch 400 is in the disconnected state when the component on the outer surface 420 side rotates relative to the component on the inner surface 410 side in a direction and the one-way clutch 400 is in the connected state when the component on the outer surface 420 side rotates relative to the component on the inner surface 410 side in another direction.

The one-way clutch 400 may be one of a roller-type one-way clutch and a wedge-type one-way clutch. When the one-way clutch 400 is the wedge-type one-way clutch, the locking component 430 is a wedge wheel. For an outer diameter of the wedge-type one-way clutch, when the one-way clutch 400 is in the connected state, the outer diameter of the wedge-type one-way clutch increases under the function of the wedge wheel in the one-way clutch 400, which increases an acting force on the first floating gear 200. When a connection structure among the one-way clutch 400, the first connection mechanism 300, and the first floating gear 200 in this application is used, an impact of an acting force generated due to the locking of the one-way clutch 400 on the accuracy of gear transmission can be effectively reduced.

In this embodiment, still with reference to FIG. 1, a housing 13 is further disposed outside the two-speed transmission system 10. The housing 13 can be used to protect the two-speed transmission system 10 or can be used as a support carrier for some components in the two-speed transmission system 10. For example, the first shaft 20 and the second shaft 30 may be supported on the housing 13 by using a connection apparatus.

Figure 5:
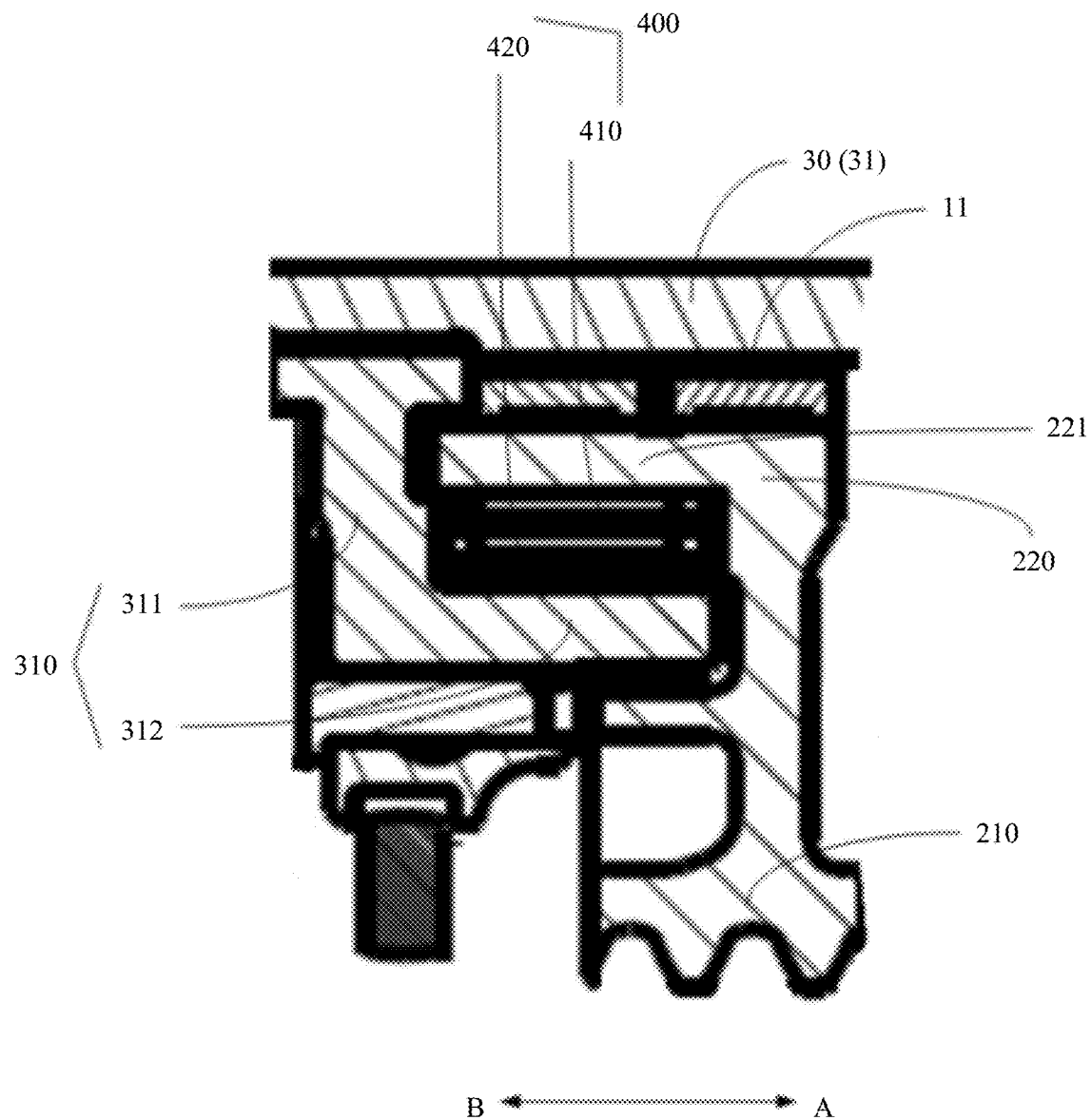
FIG. 5 is a schematic diagram of structures of a first connection mechanism and a first floating gear in a two-speed transmission system according to an embodiment of this application.

Still with reference to FIG. 2, in an embodiment, the first floating gear 200 includes a first floating transmission tooth surface 210 and a first floating connection part 220. The first floating transmission tooth surface 210 is disposed away from the second shaft 30 relative to the first floating connection part 220. The first floating transmission tooth surface 210 is configured to engage with the first fixed gear 100. The first floating connection part 220 is configured to connect to the second shaft 30 through rotation to connect the first floating gear 200 to the second shaft 30 through rotation. The first floating connection part 220 includes a first extension part 221 extending in an axial direction of the second shaft 30. The inner surface 410 of the one-way clutch 400 is sleeved on a surface of the first extension part 221 away from the second shaft 30 and is fixedly connected to the first extension part 221. The inner surface 410 of the one-way clutch 400 is connected to the first floating gear 200. The inner surface 410 of the one-way clutch 400 is connected to the first extension part 221, and the first extension part 221 is disposed close to the second shaft 30, so that a size of the one-way clutch 400 can be set relatively small, to reduce the costs. In this embodiment, the first extension part 221 extends in the axial direction of the second shaft 30 to a right side A in FIG. 2. In some implementations, the first extension part 221 extends in the axial direction of the second shaft 30 to a left side B (as shown in FIG. 5).

The first floating connection part 220 may be connected to the second shaft 30 through rotation by using the bearing 11.

Still with reference to FIG. 2, in an embodiment, the first connection mechanism 300 includes a gear hub 310 fixedly connected to the second shaft 30. The gear hub 310 includes a gear hub connection part 311 and a second extension part 312. The second extension part 312 is disposed away from the second shaft 30 relative to the gear hub connection part 311. The second extension part 312 extends in an opposite direction of an extension direction of the first extension part 221. The second extension part 312 is sleeved on the outer surface 420 of the one-way clutch 400 and abuts against the outer surface 420 of the one-way clutch 400. The outer surface 420 of the one-way clutch 400 abuts against the first connection mechanism 300. In this embodiment, the second extension part 312 extends in the axial direction of the second shaft 30 to the left side B in FIG. 2 (as shown in FIG. 2). In some implementations, the second extension part 312 extends in the axial direction of the second shaft 30 to the right side A (as shown in FIG. 5). A distance between the second extension part 312 and the second shaft 30 is greater than a distance between the first extension part 221 and the second shaft 30, so that the one-way clutch 400 can be located between the first extension part 221 and the second extension part 312. The one-way clutch 400 is located at a surface between the gear tooth surface 201 and the shaft interface 202 of the first floating gear 200 in FIG. 4. In comparison with this, a size of the one-way clutch 400 may be reduced in this embodiment, to reduce the costs. When the one-way clutch 400 is connected and the first floating gear 200 rotates, a power transmission path is sequentially the first extension part 221, the inner surface 410, the outer surface 420, the second extension part 312, the gear hub connection part 311, and the second shaft 30. The acting force of the outer surface 420 directly acts on the second extension part 312, to reduce the impact on the accuracy of gear transmission between the first fixed gear 100 and the first floating gear 200.

Still with reference to FIG. 2, in an embodiment, the first floating gear 200 further includes a first gear shift ring 230. The first gear shift ring 230 is configured to connect to or disconnect from the first connection mechanism 300. The first connection mechanism 300 has a ring matching the first gear shift ring 230. When the first gear shift ring 230 and the ring are engaged, the first gear shift ring 230 is connected to the first connection mechanism 300. When the first gear shift ring 230 and the ring are separated, the first gear shift ring 230 is disconnected from the first connection mechanism 300. If only the one-way clutch 400 is used to fix the first floating gear 200 and the first connection mechanism 300, the one-way clutch 400 is easily affected by fluctuation of the rotation speed of the second shaft 30, so that the locking of the one-way clutch 400 is not stable. Therefore, the first gear shift ring 230 is disposed on the first floating gear 200 to engage with and be connected to the first connection mechanism 300, thereby improving connection stability.

In an embodiment, the first floating gear 200 further includes a first transmission connection part 240 located between the first floating transmission tooth surface 210 and the first floating connection part 220. The first transmission connection part 240 is located at an end of the first floating connection part 220 away from the first extension part 221. The first gear shift ring 230 is connected to the first transmission connection part 240. The first gear shift ring 230 extends in the same direction as the first extension part 221. An end of the first gear shift ring 230 away from the first transmission connection part 240 is connected to or disconnected from the first connection mechanism 300. In this embodiment, a distance between the first gear shift ring 230 and the second shaft 30 is greater than a distance between the second extension part 312 and the second shaft 30. The first gear shift ring 230 is fixed relative to the first transmission connection part 240. A ring matching the first gear shift ring 230 in the first connection mechanism 300 may move towards the first gear shift ring 230 to be engaged with or disconnected from the first gear shift ring 230.

Figure 6:
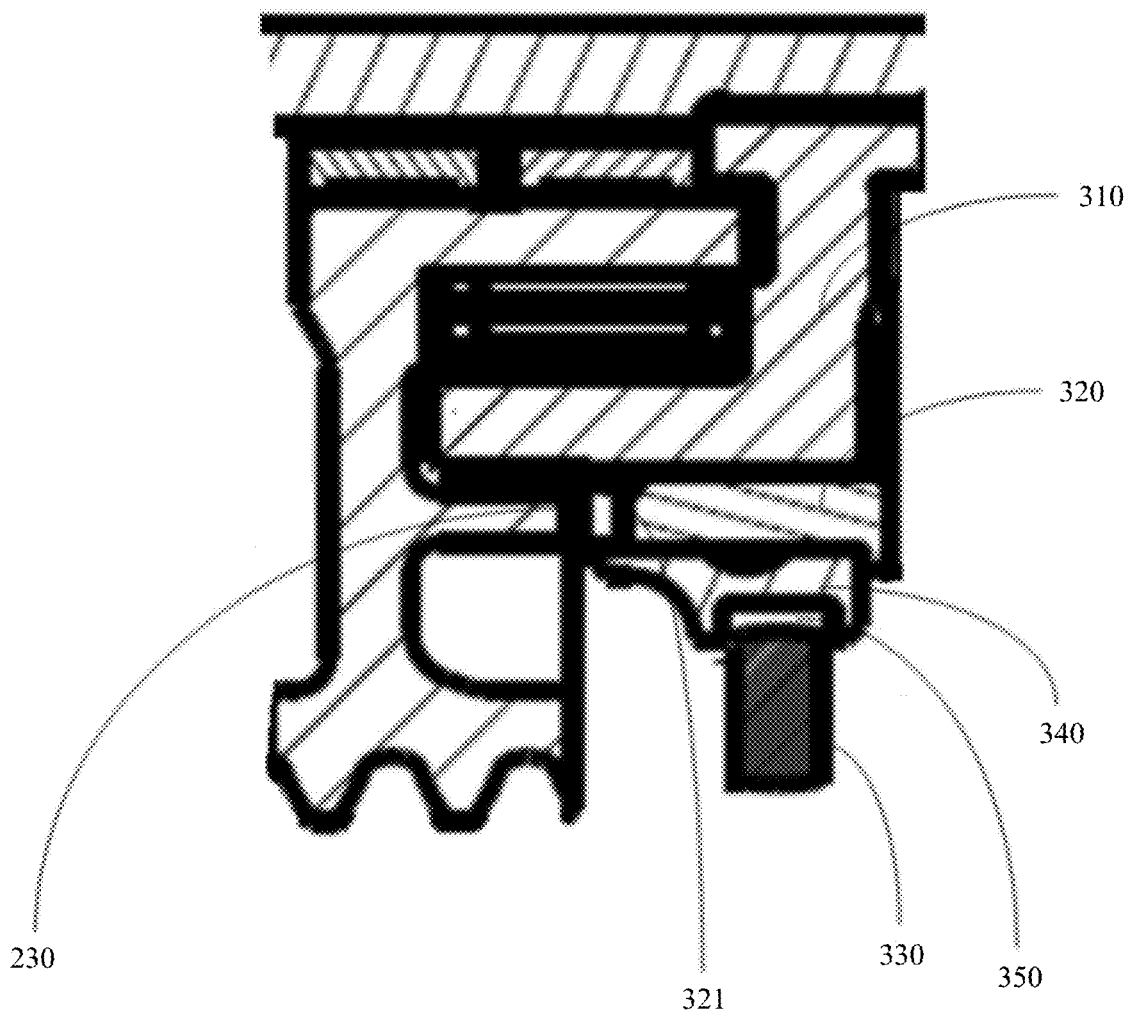
FIG. 6 is a schematic diagram of a structure of a two-speed transmission system when a first connection mechanism is disconnected from a first floating gear according to an embodiment of this application.
Figure 7:
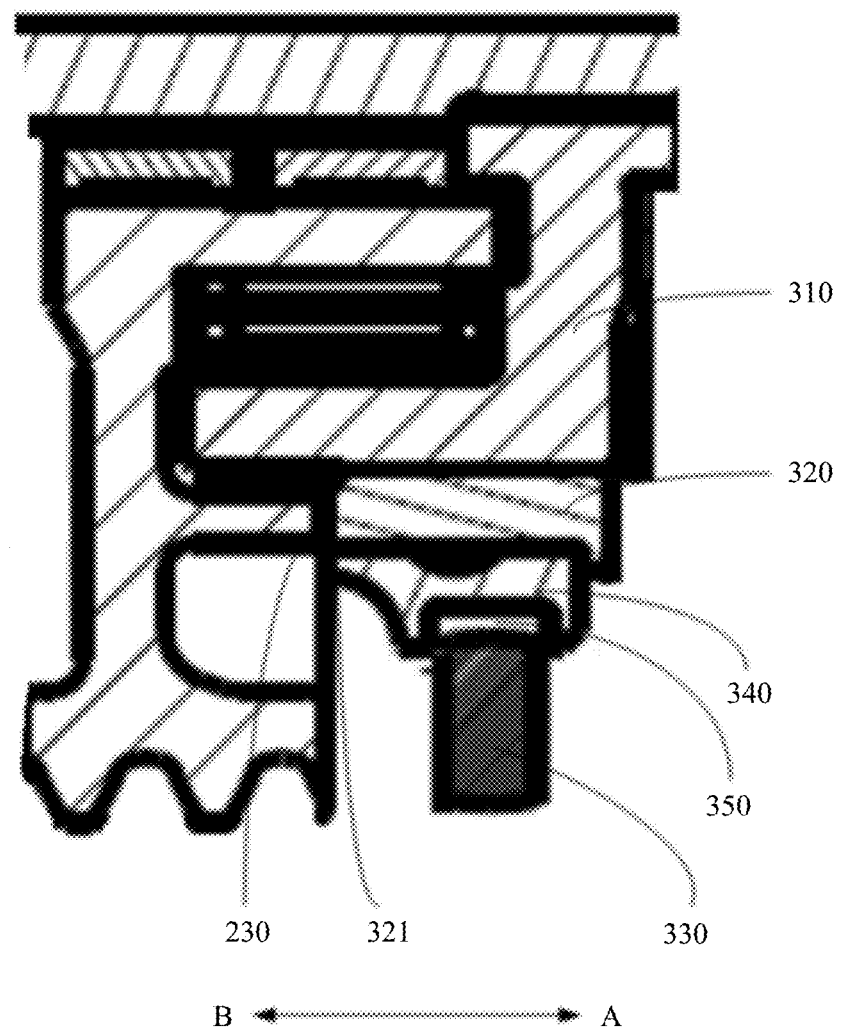
FIG. 7 is a schematic diagram of a structure of a two-speed transmission system when a first connection mechanism is connected to a first floating gear according to an embodiment of this application.

With reference to FIG. 6 and FIG. 7, in an embodiment, the first connection mechanism 300 further includes a sliding mechanism 320 and a shifting fork 330. The sliding mechanism 320 is sleeved on an outer surface of the gear hub 310 and can slide in the axial direction of the second shaft 30. The shifting fork 330 is connected to the sliding mechanism 320 and can control the sliding mechanism 320 to move in the axial direction of the second shaft 30. The sliding mechanism 320 includes a second gear shift ring 321 matching the first gear shift ring 230. The first gear shift ring 230 and the second gear shift ring 321 can be controlled to be engaged (as shown in FIG. 7) or separated (as shown in FIG. 6) when the shifting fork 330 slides in the axial direction of the second shaft 30, to implement connection and disconnection between the first connection mechanism 300 and the first floating gear 200. The second gear shift ring 321 on the first connection mechanism 300 and the first gear shift ring 230 on the first floating gear 200 are engaged when required, so that the first connection mechanism 300 and the first floating gear 200 are securely connected. In this way, the following case can be avoided: Connection between the first connection mechanism 300 and the first floating gear 200 is unstable when the fluctuation of the rotation speed occurs in the one-way clutch 400, which affects power transmission. FIG. 6 is a schematic diagram of a state in which the first gear shift ring 230 is separated from the second gear shift ring 321. FIG. 7 is a schematic diagram of a state in which the first gear shift ring 230 and the second gear shift ring 321 are engaged after the shifting fork 330 moves in the axial direction to the left side B.

The shifting fork 330 may be fixedly connected to or flexibly connected to the sliding mechanism 320. When the shifting fork 330 is fixedly connected to the sliding mechanism 320, the shifting fork 330 pushes the sliding mechanism 320 to move in the axial direction of the second shaft 30 under the function of an external force. When the shifting fork 330 is flexibly connected to the sliding mechanism 320, the shifting fork 330 pushes another component into contact with the sliding mechanism 320, and can further push the sliding mechanism 320 to move in the axial direction of the second shaft 30.

Still with reference to FIG. 7, in this embodiment, a sliding sleeve 340 away from the second shaft 30 is disposed on the sliding mechanism 320. The sliding sleeve 340 is sleeved on an outer surface of the sliding mechanism 320 and is fixedly connected to the sliding mechanism 320. A shifting fork groove 350 is disposed in the sliding sleeve 340, and the shifting fork 330 is disposed in the shifting fork groove 350. When the shifting fork 330 is flexibly connected to the sliding mechanism 320, the shifting fork groove 350 may limit the shifting fork 330 to be in the shifting fork groove 350. The shifting fork groove 350 may be a "U"-shaped groove. When an external force acts on the shifting fork 330, the shifting fork 330 abuts against a groove wall of the shifting fork groove 350, to push the sliding mechanism 320 to move in the axial direction of the second shaft 30.

Figure 8:
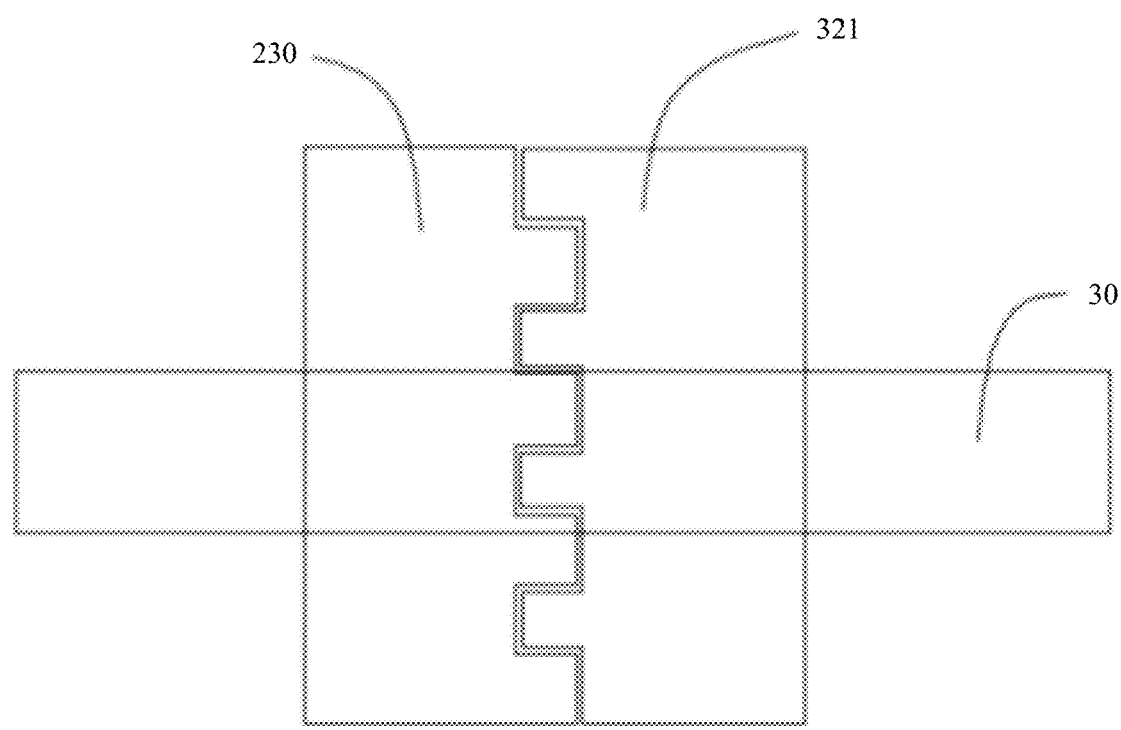
FIG. 8 is a schematic diagram of a structure of a two-speed transmission system when a first gear shift ring and a second gear shift ring are engaged according to an embodiment of this application.
Figure 9:
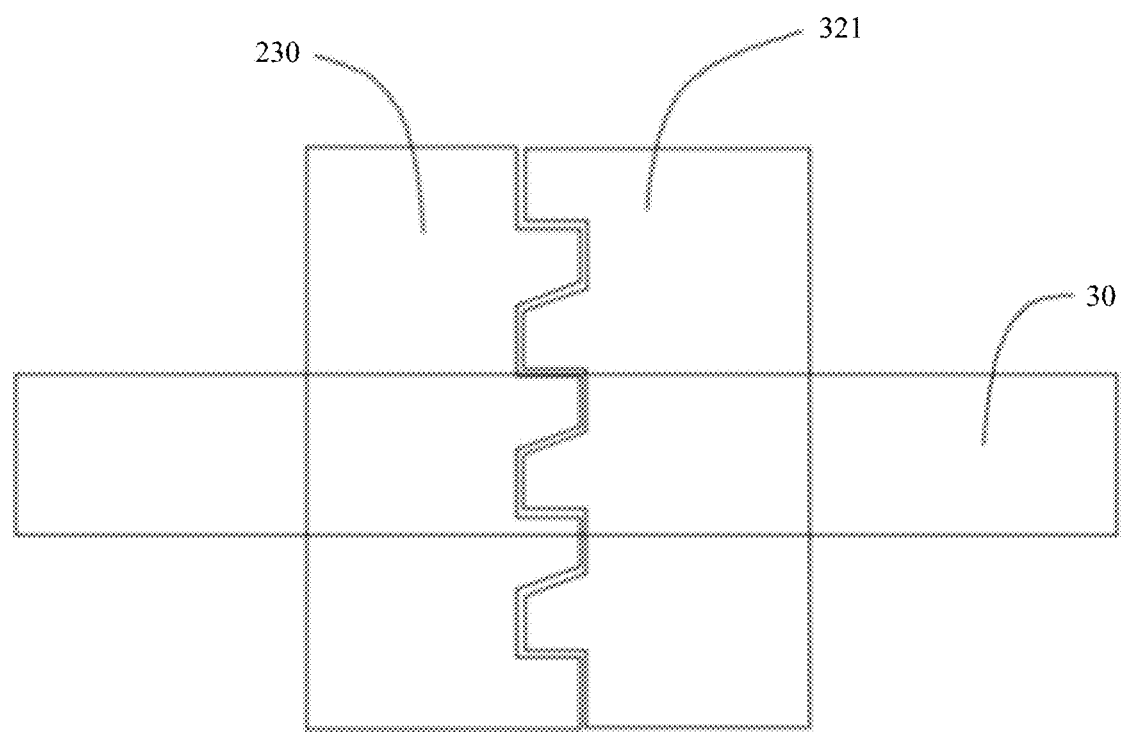
FIG. 9 is a schematic diagram of a structure of a two-speed transmission system when a first gear shift ring and a second gear shift ring are engaged according to an embodiment of this application.

With reference to FIG. 8, in this embodiment, a tooth surface of the first gear shift ring 230 and a tooth surface of the second gear shift ring 321 are perpendicular to the axial direction of the second shaft 30, so that the first gear shift ring 230 and the second gear shift ring 321 are engaged more tightly when rotate in the axial direction of the second shaft 30. A shape of a tooth part in the first gear shift ring 230 and that in the second gear shift ring 321 are not limited to one of a rectangle (as shown in FIG. 8), a trapezoid (as shown in FIG. 9), or a square.

Still with reference to FIG. 1, in an embodiment, the second fixed gear 500 is sleeved on a fixed shaft and is fixedly connected to the fixed shaft. The fixed shaft is one of the first shaft 20 and the second shaft 30. The fixed shaft indicates a shaft on which the second fixed gear 500 is located. In this embodiment, the fixed shaft is the first shaft 20 and is the input shaft 21. In other words, the second fixed gear 500 is sleeved on the first shaft 20 (the input shaft 21) and is fixedly connected to the first shaft 20 (the input shaft 21). The second fixed gear 500 is a second driving gear. In an embodiment, the second fixed gear 500 is not limited to be fastened on the first shaft 20 (the input shaft 21) in a key manner, a welding manner, and an integrated forming manner. The key includes a flat key or a spline.

The second floating gear 600 is sleeved on a floating shaft. The second floating gear 600 can rotate relative to the floating shaft. The second fixed gear 500 and the second floating gear 600 are permanently engaged, to transmit second-gear power. The floating shaft is the other one of the first shaft 20 and the second shaft 30. The floating shaft indicates a shaft on which the second floating gear 600 is located. In this embodiment, the floating shaft is the second shaft 30 and is the intermediate shaft 31. In other words, the second floating gear 600 is sleeved on the second shaft 30 (the intermediate shaft 31) and is connected to the second shaft 30 (the intermediate shaft 31) through rotation. The second floating gear 600 is a second driven gear. The second floating gear 600 is connected to the second shaft 30 (the intermediate shaft 31) through rotation. This indicates that the second floating gear 600 and the second shaft 30 are not fixed and can implement differential rotation. Specifically, the second floating gear 600 is connected to the second shaft 30 through rotation by using the bearing 11.

The second connection mechanism 700 is fastened on the floating shaft and is configured to implement connection or disconnection between the second floating gear 600 and the floating shaft. When the second floating gear 600 and the floating shaft are connected by using the second connection mechanism 700, the second floating gear 600 and the floating shaft rotate at the same rotation speed. When the second floating gear 600 and the floating shaft are disconnected by using the second connection mechanism 700, a rotation speed of the floating shaft is not controlled by the second floating gear 600.

In this embodiment, the floating shaft is the second shaft 30 (the intermediate shaft 31). In other words, the second connection mechanism 700 is fastened on the second shaft 30 (the intermediate shaft 31) and is configured to implement connection or disconnection between the second floating gear 600 and the second shaft 30 (the intermediate shaft 31). When the second floating gear 600 and the second shaft 30 (the intermediate shaft 31) are connected by using the second connection mechanism 700, the second floating gear 600 and the second shaft 30 (the intermediate shaft 31) transmit the second-gear power at the same rotation speed. When the second floating gear 600 and the second shaft 30 (the intermediate shaft 31) are disconnected by using the second connection mechanism 700, the rotation speed of the second shaft 30 (the intermediate shaft 31) is not controlled by the second floating gear 600. The rotation speed of the second shaft 30 (the intermediate shaft 31) is not controlled by the second floating gear 600. It indicates that the second shaft 30 and the second floating gear 600 can implement differential rotation. The second shaft 30 may be controlled by the first-gear a power transmission path, that is, may be controlled by the path of the first shaft 20, the first fixed gear 100, the first floating gear 200, the first connection mechanism 300, and the second shaft 30.

In this embodiment, the second-gear power is at a high-speed gear, and the first-gear power is at a low-speed gear. When the first shaft 20 (the input shaft 21) at the first gear rotates at the same rotation speed as the first shaft 20 at the second gear, the rotation speed of the second shaft 30 when the power is transmitted to the second shaft 30 (the intermediate shaft 31) by using the second-gear a power transmission path is greater than the rotation speed of the second shaft 30 when the power is transmitted to the second shaft 30 (the intermediate shaft 31) by using the first-gear a power transmission path. A radius of the first driving gear on the input shaft 21 is less than a radius of the second driving gear. A radius of the first driven gear on the intermediate shaft 31 is greater than a radius of the second driven gear. In this embodiment, a radius of the first fixed gear 100 is less than a radius of the second fixed gear 500, and a radius of the first floating gear 200 is greater than a radius of the second floating gear 600.

When the two-speed transmission system 10 performs power transmission by using the first gear, the first connection mechanism 300 connects the first floating gear 200 to the second shaft 30 (the intermediate shaft 31). The one-way clutch 400 is in the connected state. The first-gear power transmission path is sequentially the first shaft 20 (the input shaft 21), the first fixed gear 100, the first floating gear 200, the one-way clutch 400, the first connection mechanism 300, and the second shaft 30 (the intermediate shaft 31). During the first-gear power transmission, the first floating gear 200 and the second shaft 30 (the intermediate shaft 31) may be both connected to the one-way clutch 400 by using the first connection mechanism 300.

When the two-speed transmission system 10 changes from the first gear to the second gear for power transmission, the first floating gear 200 and the second shaft 30 (the intermediate shaft 31) are first disconnected by using the first connection mechanism 300, and the one-way clutch 400 stays in the connected state. In this case, the second shaft 30 may continue to receive the power transmission of the first shaft 20 by using the one-way clutch 400 to keep rotation. In addition, the second floating gear 600 and the second shaft 30 (the intermediate shaft 31) are connected by using the second connection mechanism 700. The second-gear power transmission path is sequentially the first shaft 20 (the input shaft 21), the second fixed gear 500, the second floating gear 600, the second connection mechanism 700, and the second shaft 30 (the intermediate shaft 31). Because the radius of the first fixed gear 100 is less than the radius of the second fixed gear 500, and the radius of the first floating gear 200 is greater than the radius of the second floating gear 600, the rotation speed of the second floating gear 600 is greater than the rotation speed of the first floating gear 200, and further the rotation speed of the second shaft 30 controlled by the second-gear power transmission path is greater than the rotation speed of the second shaft 30 controlled by the first-gear power transmission path. The second shaft 30 rotates with the second floating gear 600. The first connection mechanism 300 is fastened on the second shaft 30. The first connection mechanism 300 and the second shaft 30 rotate at the same speed. In this case, the rotation speed of the first connection mechanism 300 is greater than the rotation speed of the first floating gear 200, and the one-way clutch 400 enters the disconnected state. In other words, in this case, the first floating gear 200 idles around the second shaft 30, and the rotation speed of the second shaft 30 is fully controlled by the second-gear power transmission path. The first-gear power is changed to the second-gear power to implement a power transmission process. Due to functions of the one-way clutch 400 and the friction clutch 700, a power loss problem does not occur in a gear shift process.

In an embodiment, the second floating gear 600 includes a second floating transmission gear part 610 and a second floating hollow shaft 620. The second floating transmission gear part 610 and the second fixed gear 500 are engaged. The second floating hollow shaft 620 is sleeved outside the floating shaft and is connected to the floating shaft through rotation. The second connection mechanism 700 is connected to the second floating hollow shaft 620. In this embodiment, the second floating hollow shaft 620 is sleeved on the second shaft 30 (the intermediate shaft 31) and is connected to the second shaft 30 (the intermediate shaft 31) through rotation by using the bearing 11.

Figure 10:
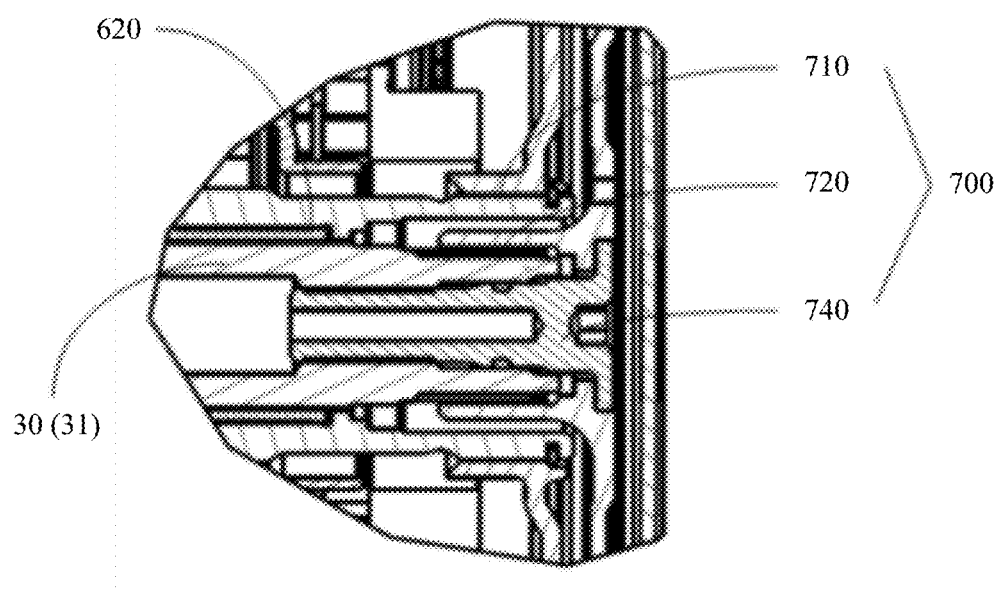
FIG. 10 is a schematic diagram of a local structure of a two-speed transmission system according to an embodiment of this application.

FIG. 10 is a locally enlarged diagram of FIG. 1. In an embodiment, the second connection mechanism 700 is a friction clutch. The friction clutch 700 includes a first rotation interface 710, a second rotation interface 720, and a plurality of friction plates 730 (as shown in FIG. 1). The first rotation shaft interface 710 is fixedly connected to an outer surface of the second floating hollow shaft 620 away from the floating shaft (the second shaft 30). The second rotation interface 720 is fixedly connected to the floating shaft (the second shaft 30). The friction clutch 700 controls connection and disconnection between the second floating gear 600 and the floating shaft (the second shaft 30) through connection and disconnection between the plurality of friction plates 730. The friction clutch 700 may be a normally open friction clutch or a normally closed friction clutch. When the friction clutch 700 is the normally open friction clutch, and there is no external force acting on the friction plates 730, the acting force cannot be transmitted due to a gap between the friction plates 730. In this case, the friction clutch 700 is in a disconnected state, and the second floating gear 600 and the floating shaft (the second shaft 30) are disconnected. When the external force acts on the plurality of friction plates 730, the friction plates 730 are gradually bonded to each other to transmit the acting force. In this case, the friction clutch 700 is in a connected state, and the second floating gear 600 and the floating shaft (the second shaft 30) may be connected. A working principle of the normally closed friction clutch is the same as that of the normally open friction clutch.

In an embodiment, the friction clutch 700 further includes a fastening screw 740. The fastening screw 740 is fastened on the floating shaft in an axial direction of the floating shaft, to fixedly connect the friction clutch 700 to the floating shaft.

Figure 11:
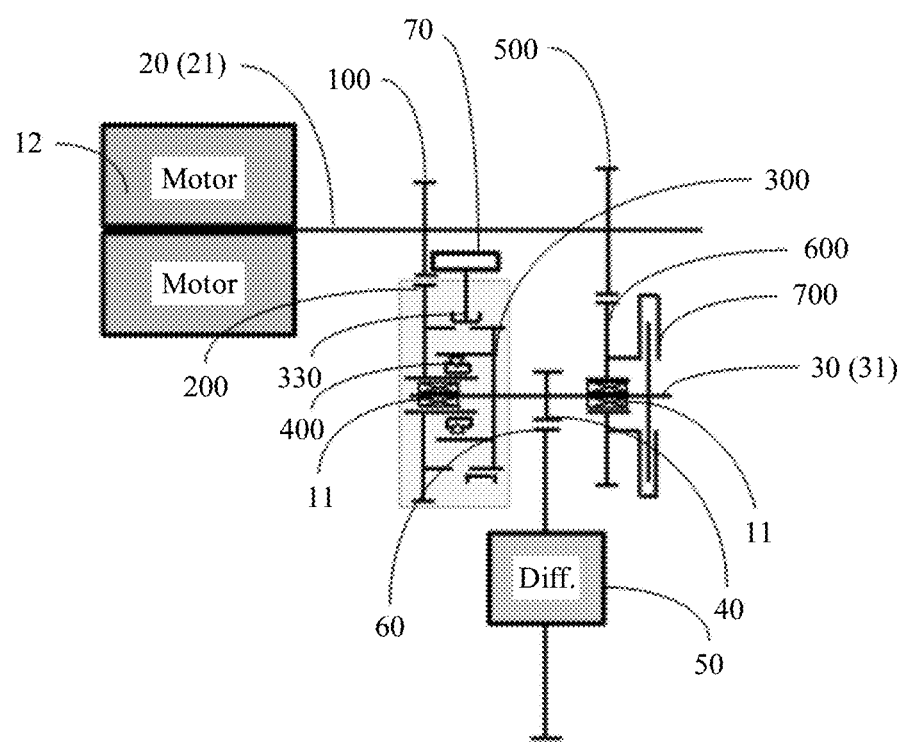
FIG. 11 is a schematic diagram of a structure of a two-speed transmission system according to an embodiment of this application.

With reference to FIG. 11, in an embodiment, the second shaft 30 (the intermediate shaft 31) is configured to sequentially transmit power to a final driving gear 40, a final driven gear 60, and a differential mechanism 50. The differential mechanism 50 is configured to transmit power to a vehicle tire, to drive the tire to rotate.

In an embodiment, one end of the shifting fork 330 is electrically connected to an actuator 70. A control program used for the first gear, the second gear, and the gear shift in the two-speed transmission system 10 is set in the actuator 70. The control program controls the shifting fork 330 to move in the axial direction under specific conditions, to control disconnection and connection of the first connection mechanism 300. In some implementations, the actuator 70 is further connected to the second connection mechanism 700 and is configured to exert an acting force on the friction plates 730 under a specific condition according to a control program to control disconnection and connection of the second connection mechanism 700.

Figure 12:
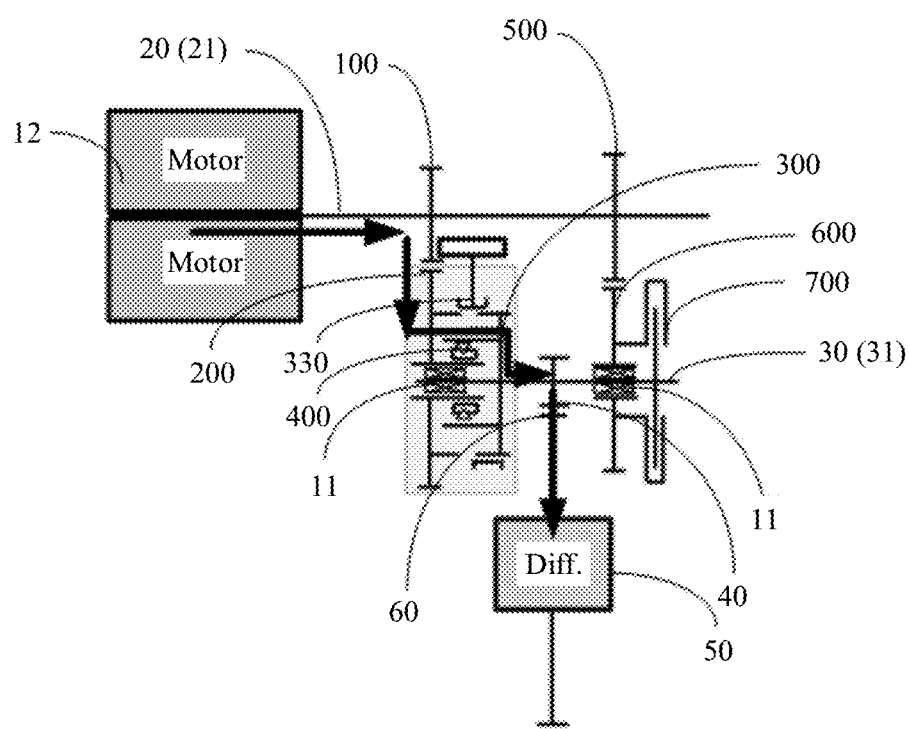
FIG. 12 is a schematic diagram of a first-gear power transmission path of a two-speed transmission system according to an embodiment of this application.
Figure 13:
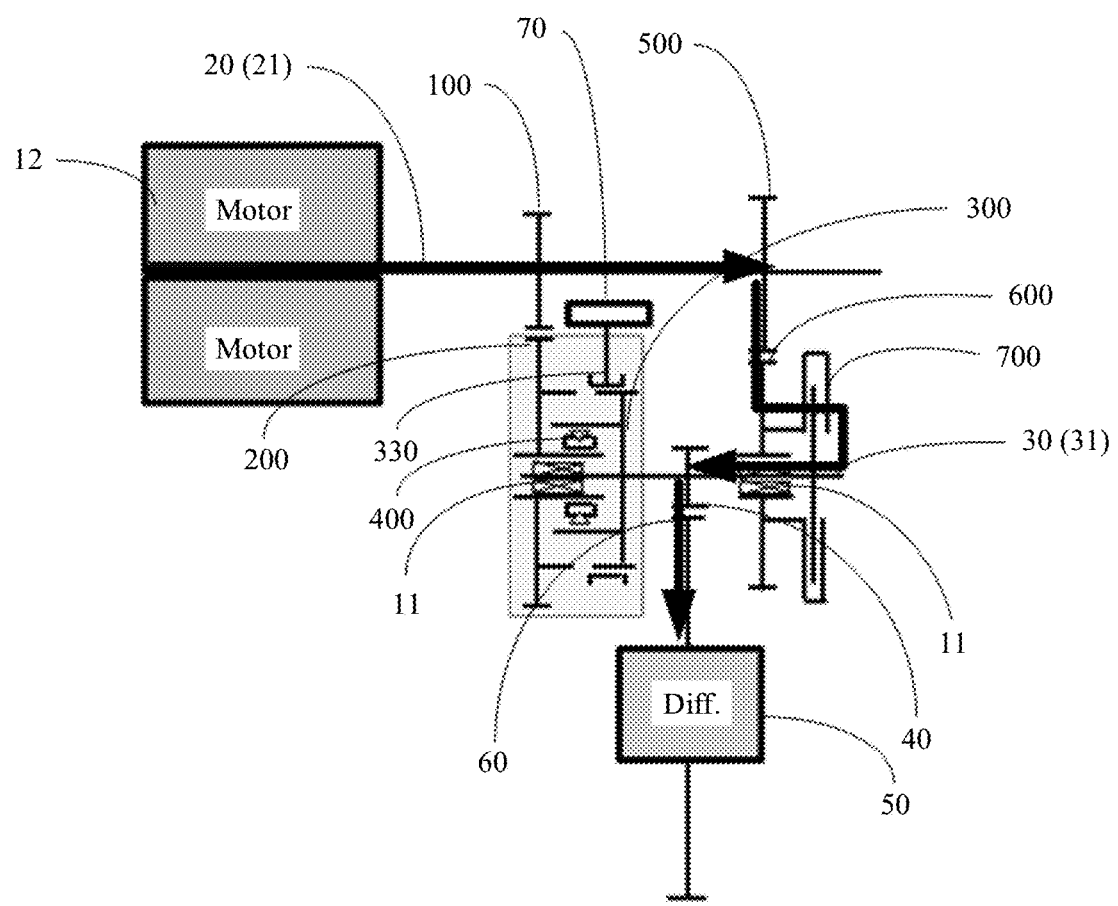
FIG. 13 is a schematic diagram of a second-gear power transmission path of a two-speed transmission system according to an embodiment of this application.

The following describes a working process of the two-speed transmission system 10 in this embodiment with reference to FIG. 12 and FIG. 13. FIG. 12 is the first-gear a power transmission path of the two-speed transmission system 10. FIG. 13 is the second-gear a power transmission path of the two-speed transmission system 10.

When the two-speed transmission system 10 is driven by the first-gear power, the first connection mechanism 300 is connected to the first floating gear 200. The one-way clutch 400 is in the connected state. The second connection mechanism 700 disconnects the second floating gear 600 from the second shaft 30 (the intermediate shaft 31). When a drive motor 12 drives the first shaft 20 (the input shaft 21) to rotate, the first-gear power transmission path is sequentially the first shaft 20 (the input shaft 21), the first fixed gear 100, the first floating gear 200, the one-way clutch 400, the first connection mechanism 300, and the second shaft 30 (the intermediate shaft 31). The second shaft 30 (the intermediate shaft 31) is configured to sequentially transmit the power to the final driving gear 40, the final driven gear 60, and the differential mechanism 50 (as shown in FIG. 12).

When driving of the first-gear power is changed to driving of the second-gear power, the first connection mechanism 300 is first disconnected from the first floating gear 200, and the one-way clutch 400 stays in the connected state. In this case, the second shaft 30 may continue to receive, by using the one-way clutch 400, the power transmitted by the first shaft 20 to keep rotation, and then connect the second floating gear 600 to the second shaft 30 (the intermediate shaft 31) by using the second connection mechanism 700. The radius of the first fixed gear 100 is less than the radius of the second fixed gear 500, and the radius of the first floating gear 200 is greater than the radius of the second floating gear 600. Therefore, the rotation speed of the second floating gear 600 is greater than the rotation speed of the first floating gear 200. The second floating gear 600 drives the second shaft 30 (the intermediate shaft 31) to rotate at a high rotation speed. The first connection mechanism 300 rotates with the second shaft 30 (the intermediate shaft 31) at a high rotation speed. The rotation speed of the first connection mechanism 300 is greater than the rotation speed of the first floating gear 200. In this case, the one-way clutch 400 is changed to the disconnected state. In this case, gear shift is completed. The second-gear power transmission path is sequentially the first shaft 20 (the input shaft 21), the second fixed gear 500, the second floating gear 600, the second connection mechanism 700, and the second shaft 30 (the intermediate shaft 31). The second shaft 30 (the intermediate shaft 31) is configured to sequentially transmit power to the final driving gear 40, the final driven gear 60, and the differential mechanism 50 (as shown in FIG. 13).

During driving using the first-gear power or in a process of changing from the first-gear power to the second-gear power, because the outer surface 420 of the one-way clutch 400 abuts against the first connection mechanism 300, the acting force of the outer surface 420 directly acts on the first connection mechanism 300 instead of a tooth surface between the first floating gear 200 and the first fixed gear 100. This can avoid the following case: Accuracy of gear transmission between the first fixed gear 100 and the first floating gear 200 is affected because the first fixed gear 100 and the first floating gear 200 are engaged more tightly due to the acting force of the one-way clutch 400. When driving of the first-gear power is changed to driving of the second-gear power, power transmission from the first shaft 20 is constantly performed on the second shaft 30 under the function of the one-way clutch 400. Therefore, a power loss problem does not occur in the second shaft 30, or power interruption does not occur, to improve driving performance of the entire vehicle.

Figure 14:
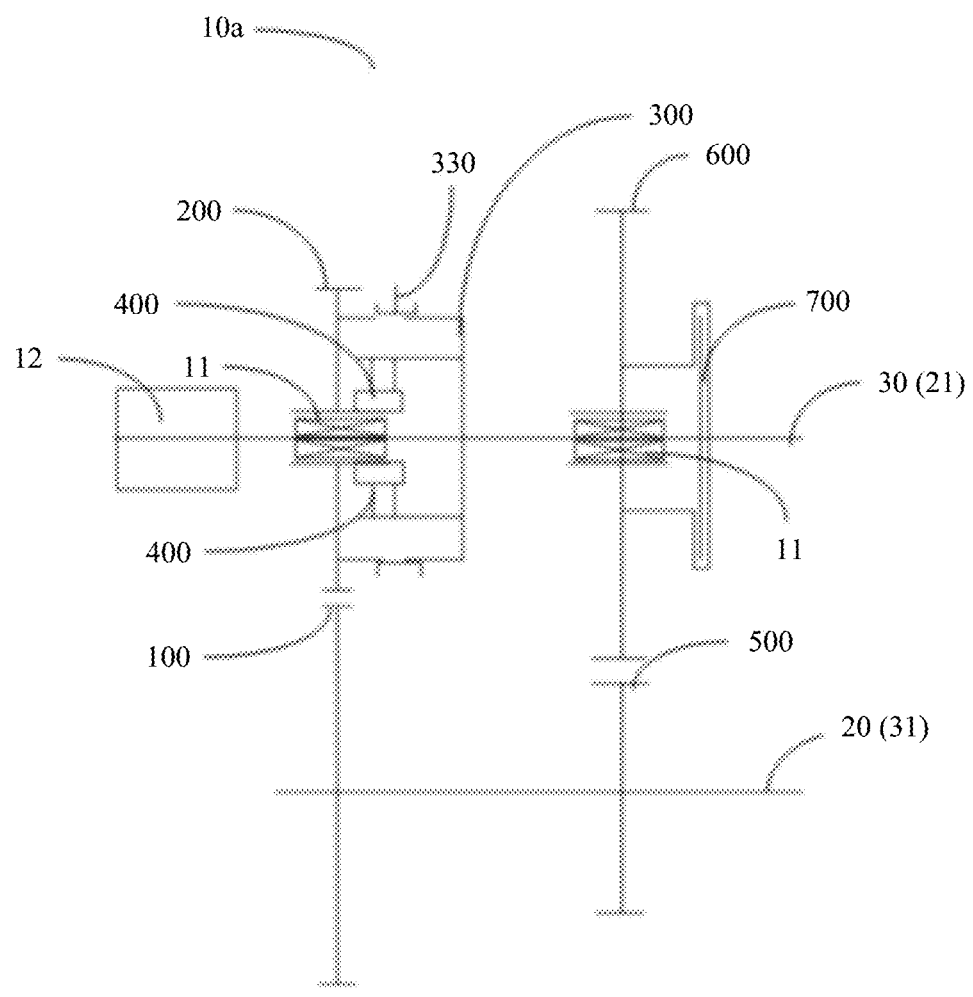
FIG. 14 is a schematic diagram of a structure of a two-speed transmission system according to an embodiment of this application.

With reference to FIG. 14, an embodiment of this application further provides a two-speed transmission system 10*a*. A difference from the implementation shown in FIG. 1 is that the first shaft 20 is the intermediate shaft 31, the second shaft 30 is the input shaft 21, the fixed shaft is the first shaft 20 and the intermediate shaft 31, the floating shaft is the second shaft 30 and the input shaft 21, the first fixed gear 100 is the first driven gear, the first floating gear 200 is the first driving gear, the second fixed gear 500 is the second driven gear, the second floating gear 600 is the second driving gear, the first connection mechanism 300 is fixedly connected to the input shaft 21 (the second shaft 30), the second connection mechanism 700 is fixedly connected to the input shaft 21 (the second shaft 30), the first floating gear 200 is connected to the input shaft 21 through rotation, the second floating gear 600 is connected to the input shaft 21 through rotation, the first fixed gear 100 is fixedly connected to the intermediate shaft 31, the second fixed gear 500 is fixedly connected to the intermediate shaft 31, and the one-way clutch 400 is connected between the first floating gear 200 and the first connection mechanism 300. The radius of the first driving gear is less than the radius of the second driving gear. The radius of the first driven gear is greater than the radius of the second driven gear. In this embodiment, the radius of the first floating gear 200 is less than the radius of the second floating gear 600, and the radius of the first fixed gear 100 is greater than the radius of the second fixed gear 500.

Figure 15:
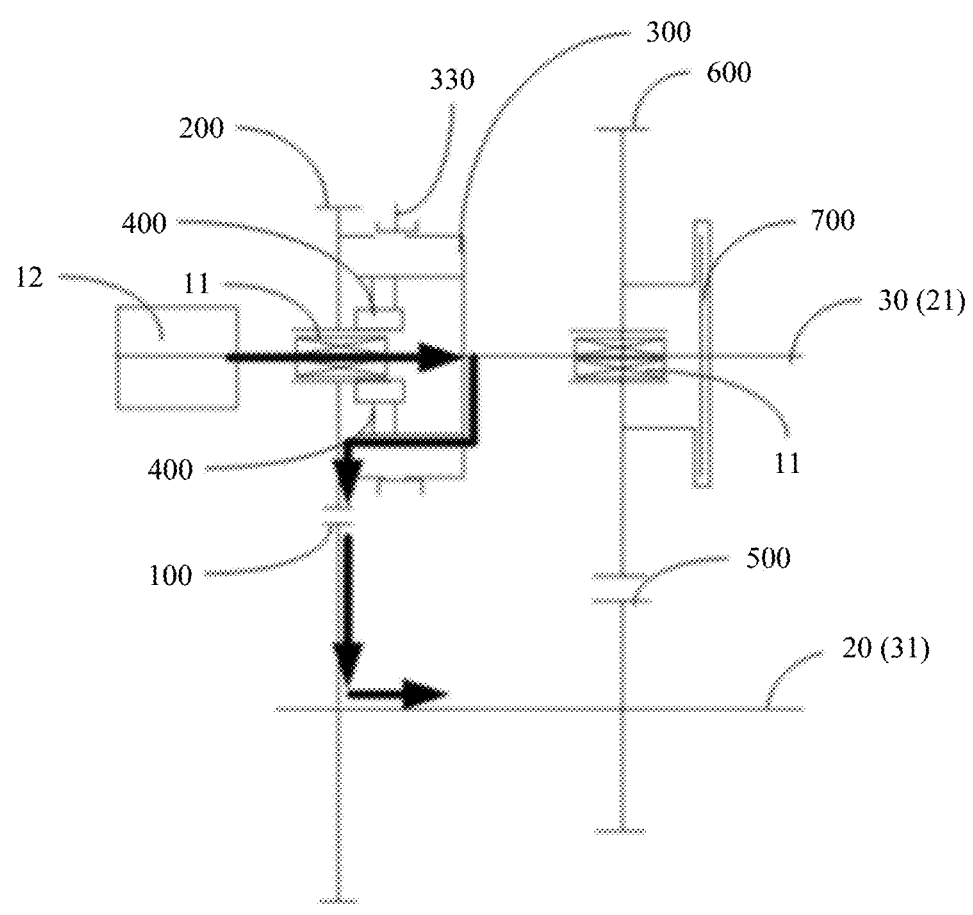
FIG. 15 is a schematic diagram of a first-gear power transmission path of a two-speed transmission system according to an embodiment of this application.
Figure 16:
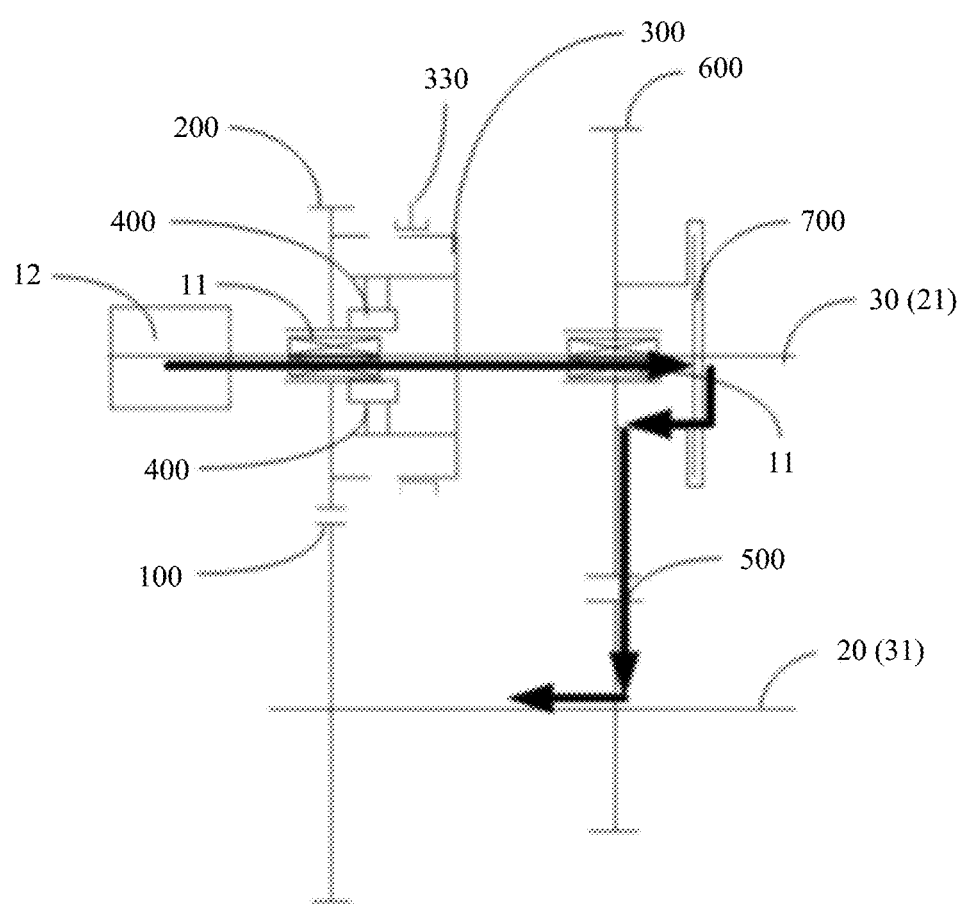
FIG. 16 is a schematic diagram of a second-gear power transmission path of a two-speed transmission system according to an embodiment of this application.

The following describes a working process of the two-speed transmission system 10*a* in this embodiment with reference to FIG. 15 and FIG. 16. FIG. 15 is the first-gear a power transmission path of the two-speed transmission system 10*a*. FIG. 16 is the second-gear a power transmission path of the two-speed transmission system 10*a*.

When the two-speed transmission system 10*a* is driven by the first-gear power, the first connection mechanism 300 is connected to the first floating gear 200. The one-way clutch 400 is in the connected state. The second connection mechanism 700 disconnects the second floating gear 600 from the second shaft 30 (the input shaft 21). When a drive motor 12 drives the second shaft 30 (the input shaft 21) to rotate, as shown in FIG. 15, the first-gear power transmission path is sequentially the second shaft 30 (the input shaft 21), the one-way clutch 400, the first connection mechanism 300, the first floating gear 200, the first fixed gear 100, and the first shaft 20 (the intermediate shaft 31).

When driving of the first-gear power is changed to driving of the second-gear power, the first connection mechanism 300 is disconnected from the first floating gear 200, and the one-way clutch 400 stays in the connected state. In this case, the second shaft 30 (the input shaft 21) may continue to transmit, by using the one-way clutch 400, the power to the first shaft 20 (the intermediate shaft 31), and the first shaft 20 (the input shaft 31) keeps rotation. In addition, the second floating gear 600 is connected to the second shaft 30 (the input shaft 21) by using the second connection mechanism 700. The radius of the first floating gear 200 is less than the radius of the second floating gear 600, and the radius of the first fixed gear 100 is greater than the radius of the second fixed gear 500. Therefore, the rotation speed of the second fixed gear 500 is greater than the rotation speed of the first fixed gear 100. The second fixed gear 500 drives the first shaft 20 (the intermediate shaft 31) and the first fixed gear 100 to rotate at a high rotation speed. The first floating gear 200 rotates with the first fixed gear 100 at a high rotation speed. The rotation speed of the first floating gear 200 is greater than the rotation speed of the first connection mechanism 300. In this case, the one-way clutch 400 is changed to the disconnected state. In this case, gear shift is completed. As shown in FIG. 16, the second-gear power transmission path is sequentially the second shaft 30 (the input shaft 21), the second connection mechanism 700, the second floating gear 600, the second fixed gear 500, and the first shaft 20 (the intermediate shaft 31).

Figure 17:
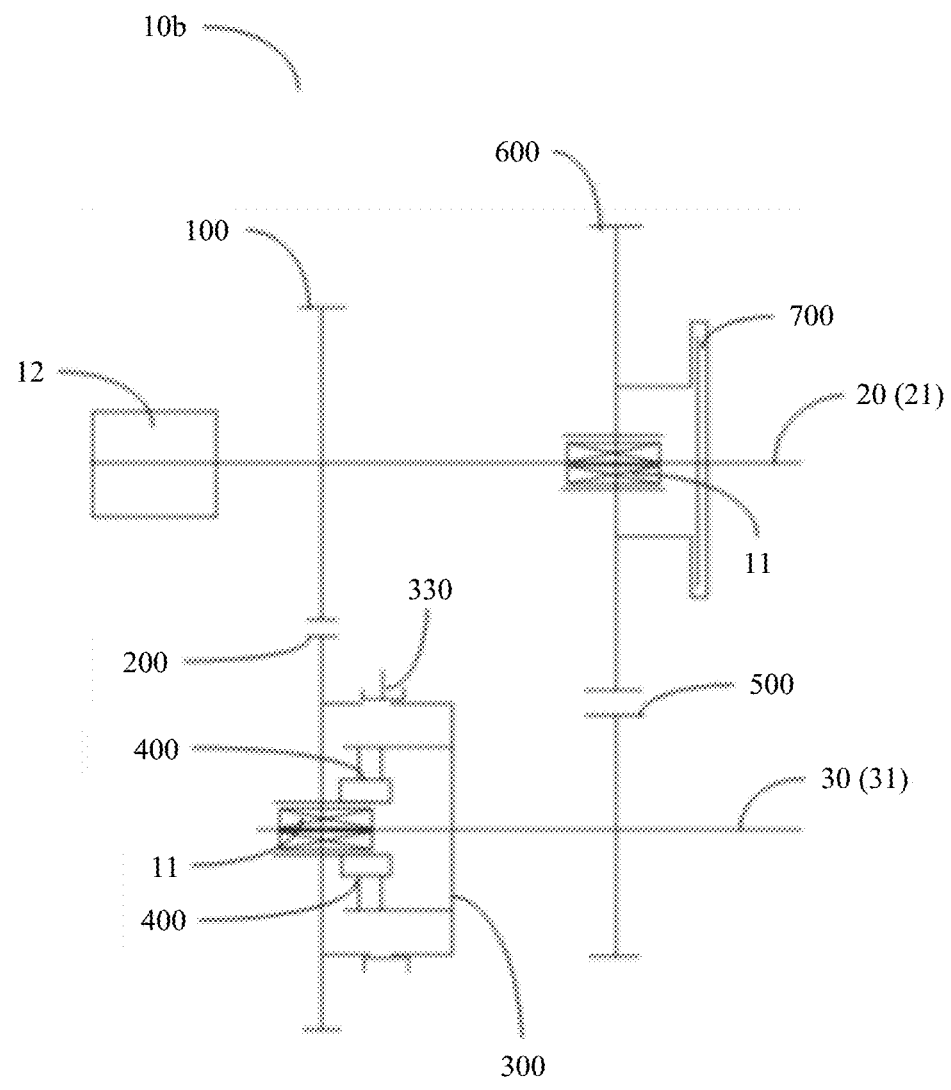
FIG. 17 is a schematic diagram of a structure of a two-speed transmission system according to an embodiment of this application.

With reference to FIG. 17, an embodiment of this application further provides a two-speed transmission system 10*b*. A difference from the implementation shown in FIG. 1 is that the fixed shaft is the second shaft 30 and the intermediate shaft 31, and the floating shaft is the first shaft 20 and the input shaft 21. In other words, the second floating gear 600 is the second driving gear, the second fixed gear 500 is the second driven gear, the second connection mechanism 700 is fixedly connected to the first shaft 20 (the input shaft 21), the second floating gear 600 is connected to the first shaft 20 (the input shaft 21) through rotation, and the second fixed gear 500 is fixedly connected to the second shaft 30 (the intermediate shaft). Another part is the same as the implementation shown in FIG. 1. The radius of the first driving gear is less than the radius of the second driving gear. The radius of the first driven gear is greater than the radius of the second driven gear. In this embodiment, the radius of the first fixed gear 100 is less than the radius of the second floating gear 600, and the radius of the first floating gear 200 is greater than the radius of the second fixed gear 500.

Figure 18:
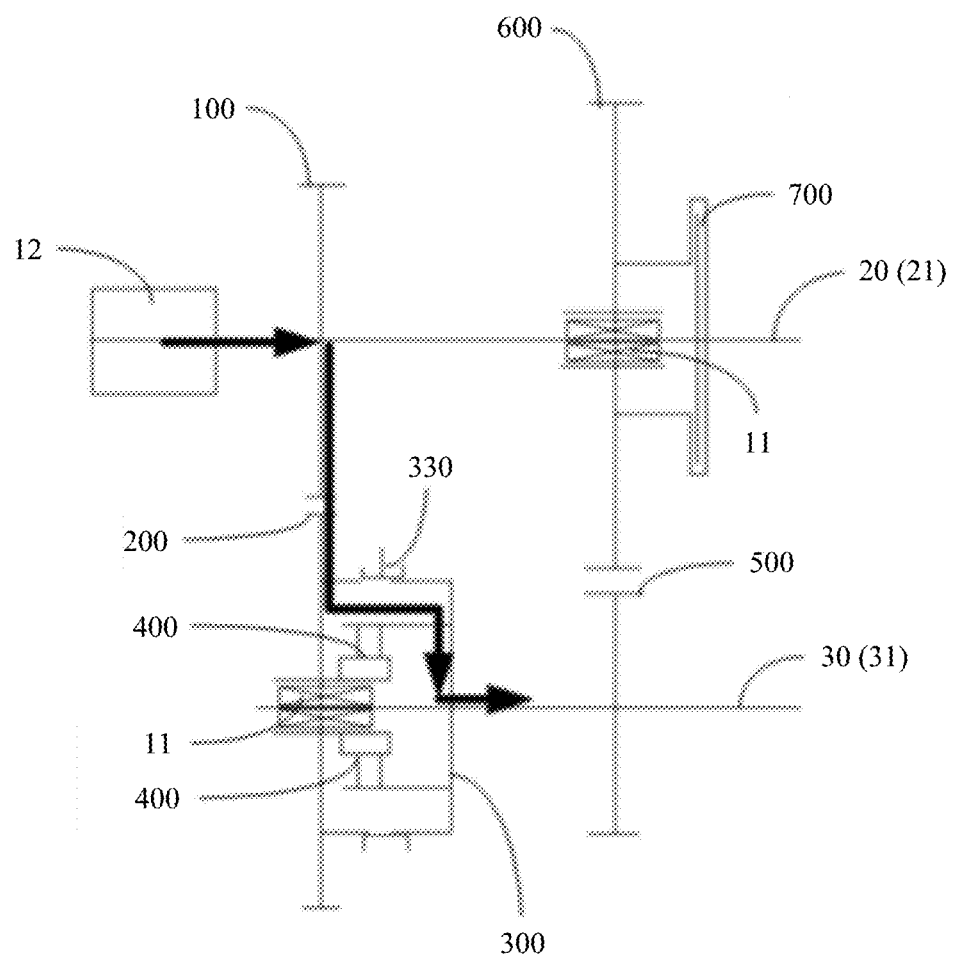
FIG. 18 is a schematic diagram of a first-gear power transmission path of a two-speed transmission system according to an embodiment of this application.
Figure 19:
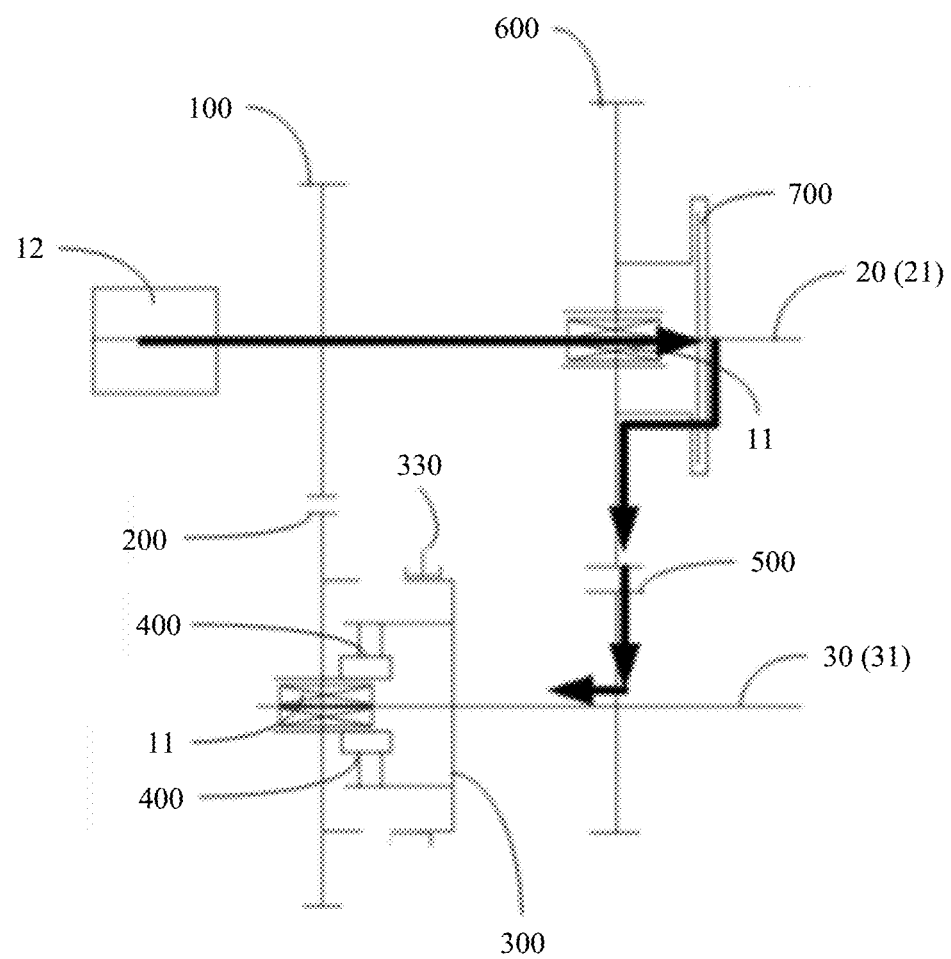
FIG. 19 is a schematic diagram of a second-gear power transmission path of a two-speed transmission system according to an embodiment of this application.

The following describes a working process of the two-speed transmission system 10*b* in this embodiment with reference to FIG. 18 and FIG. 19. FIG. 18 is the first-gear a power transmission path of the two-speed transmission system 10*b*. FIG. 19 is the second-gear a power transmission path of the two-speed transmission system 10*b*.

When the two-speed transmission system 10*b* is driven by the first-gear power, the first connection mechanism 300 is connected to the first floating gear 200. The one-way clutch 400 is in the connected state. The second connection mechanism 700 disconnects the second floating gear 600 from the first shaft 20 (the input shaft 21). When a drive motor 12 drives the first shaft 20 (the input shaft 21) to rotate, as shown in FIG. 18, the first-gear power transmission path is sequentially the first shaft 20 (the input shaft 21), the first fixed gear 100, the first floating gear 200, the one-way clutch 400, the first connection mechanism 300, and the second shaft 30 (the intermediate shaft 31). Because the second fixed gear 500 engages with the second floating gear 600, the second floating gear 600 rotates with the second fixed gear 500, but the second floating gear 600 is disconnected from the first shaft 20 (the input shaft 21). In this case, the second floating gear 600 idles around the first shaft 20 (the input shaft 21).

When driving of the first-gear power is changed to driving of the second-gear power, the first connection mechanism 300 is first disconnected from the first floating gear 200, and the one-way clutch 400 stays in the connected state. In this case, the second shaft 30 may continue to receive, by using the one-way clutch 400, the power transmitted by the first shaft 20 to keep rotation, and then connect the second floating gear 600 to the first shaft 20 (the input shaft 21) by using the second connection mechanism 700. The radius of the first fixed gear 100 is less than the radius of the second floating gear 600, and the radius of the first floating gear 200 is greater than the radius of the second fixed gear 500. Therefore, the rotation speed of the second fixed gear 500 is greater than the rotation speed of the first floating gear 200. The second fixed gear 500 drives the second shaft 30 (the intermediate shaft 31) to rotate at a high rotation speed. The first connection mechanism 300 rotates with the second shaft 30 (the intermediate shaft 31) at a high rotation speed. The rotation speed of the first connection mechanism 300 is greater than the rotation speed of the first floating gear 200. In this case, the one-way clutch 400 is changed to the disconnected state. In this case, gear shift is completed. As shown in FIG. 19, the second-gear power transmission path is sequentially the first shaft 20 (the input shaft 21), the second connection mechanism 700, the second floating gear 600, the second fixed gear 500, and the second shaft 30 (the intermediate shaft 31).

Figure 20:
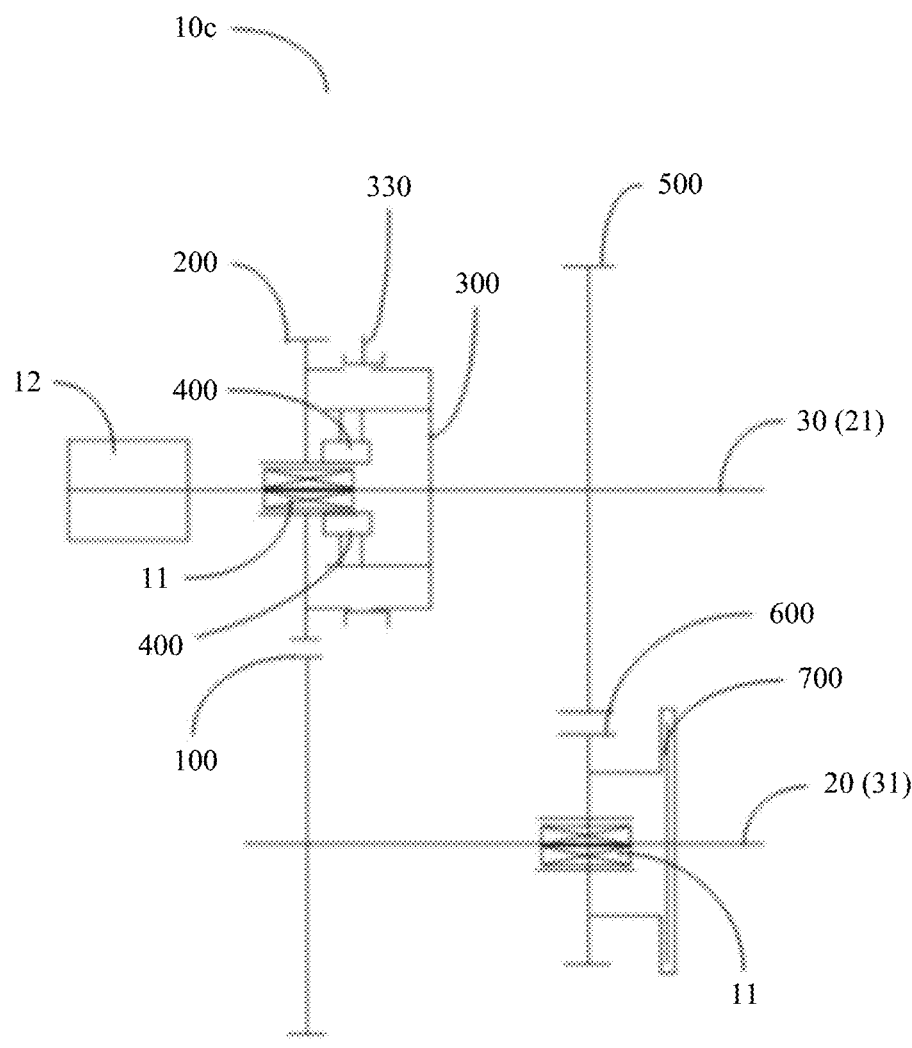
FIG. 20 is a schematic diagram of a structure of a two-speed transmission system according to an embodiment of this application.

With reference to FIG. 20, an embodiment of this application further provides a two-speed transmission system 10c. A difference from the implementation shown in FIG. 1 is that the first shaft 20 is the intermediate shaft 31, the second shaft 30 is the input shaft 21, the fixed shaft is the second shaft 30 and the input shaft 21, and the floating shaft is the first shaft 20 and the intermediate shaft 31. In other words, the first floating gear 200 is the first driving gear, the first fixed gear 100 is the first driven gear, the first connection mechanism 300 is fixedly connected to the second shaft 30 (the input shaft 21), and the first floating gear 200 is connected to the second shaft 30 (the input shaft 21) through rotation. Another part is the same as that shown in FIG. 1. The radius of the first driving gear is less than the radius of the second driving gear. The radius of the first driven gear is greater than the radius of the second driven gear. In this embodiment, the radius of the first floating gear 200 is less than the radius of the second fixed gear 500, and the radius of the first fixed gear 100 is greater than the radius of the second floating gear 600.

Figure 21:
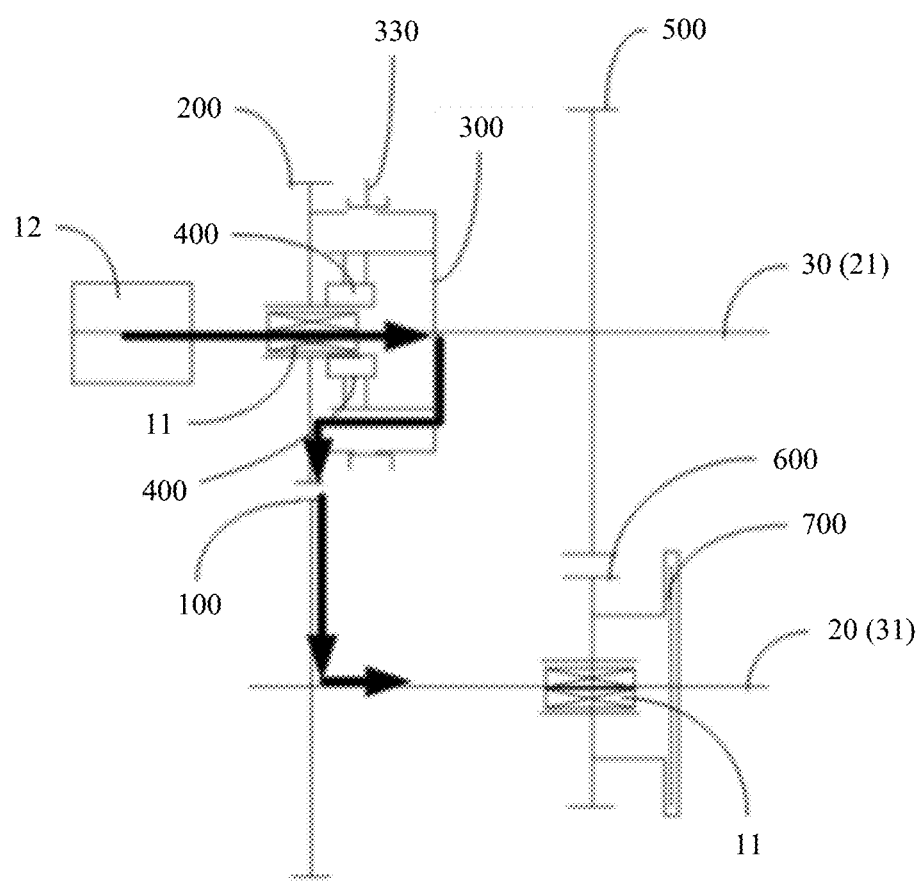
FIG. 21 is a schematic diagram of a first-gear power transmission path of a two-speed transmission system according to an embodiment of this application.
Figure 22:
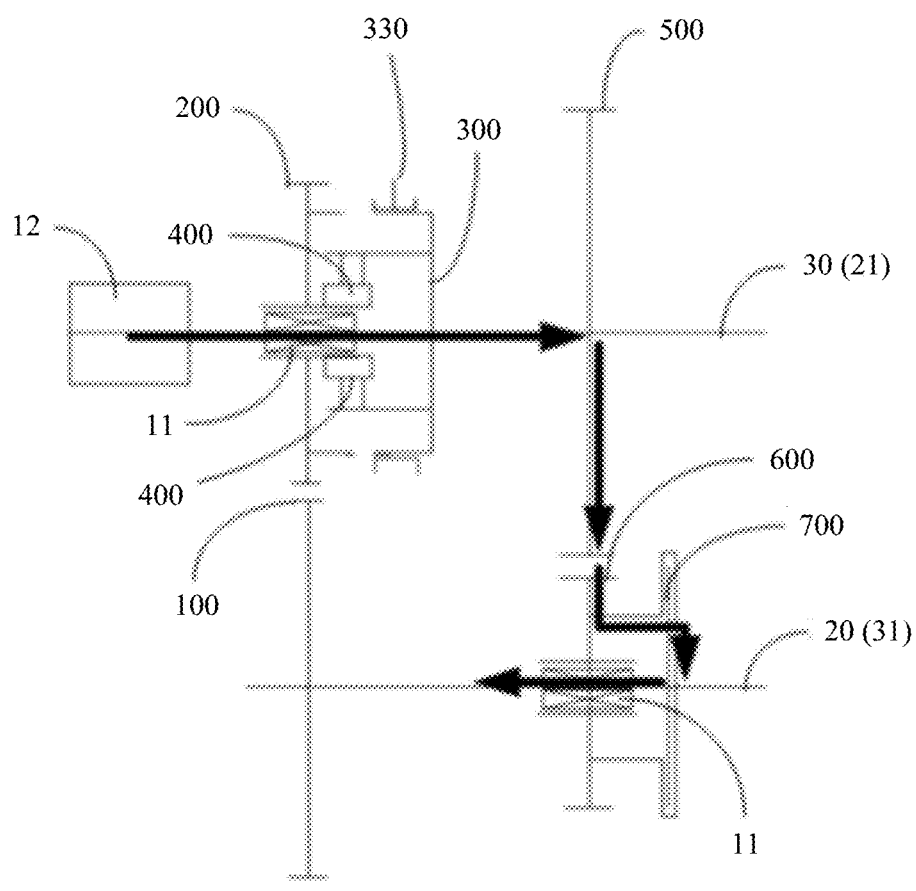
FIG. 22 is a schematic diagram of a second-gear power transmission path of a two-speed transmission system according to an embodiment of this application.

The following describes a working process of the two-speed transmission system 10c in this embodiment with reference to FIG. 21 and FIG. 22. FIG. 21 is the first-gear a power transmission path of the two-speed transmission system 10c. FIG. 21 is the second-gear a power transmission path of the two-speed transmission system 10c.

When the two-speed transmission system 10c is driven by the first-gear power, the first connection mechanism 300 is connected to the first floating gear 200. The one-way clutch 400 is in the connected state. The second connection mechanism 700 disconnects the second floating gear 600 from the first shaft 20 (the intermediate shaft 31). When a drive motor 12 drives the second shaft 30 (the input shaft 21) to rotate, as shown in FIG. 21, the first-gear power transmission path is sequentially the second shaft 30 (the input shaft 21), the one-way clutch 400, the first connection mechanism 300, the floating gear 200, the first fixed gear 100, and the first shaft 20 (the intermediate shaft 31).

When driving of the first-gear power is changed to driving of the second-gear power, the first connection mechanism 300 is first disconnected from the first floating gear 200, and the one-way clutch 400 stays in the connected state. In this case, the second shaft 30 (the input shaft 21) may continue to transmit, by using the one-way clutch 400, the power to the first shaft 20 (the intermediate shaft 31), and the first shaft 20 (the input shaft 31) keeps rotation. The second floating gear 600 is connected to the first shaft 20 (the intermediate shaft 31) by using the second connection mechanism 700. The radius of the first floating gear 200 is less than the radius of the second fixed gear 500, and the radius of the first fixed gear 100 is greater than the radius of the second floating gear 600. Therefore, the rotation speed of the second floating gear 600 is greater than the rotation speed of the first fixed gear 100. The second floating gear 600 drives the first shaft 20 (the intermediate shaft 31) and the second fixed gear 500 to rotate at a high rotation speed. The first shaft 20 (the intermediate shaft 31) drives the first fixed gear 100 and the first floating gear 200 to rotate at a high speed. The rotation speed of the first floating gear 200 is greater than the rotation speed of the first connection mechanism 300. In this case, the one-way clutch 400 is in the disconnected state. In this case, gear shift is completed. As shown in FIG. 22, the second-gear power transmission path is sequentially the second shaft 30 (the input shaft 21), the second fixed gear 500, the second floating gear 600, the second connection mechanism 700, and the first shaft 20 (the intermediate shaft 31).

Figure 23:
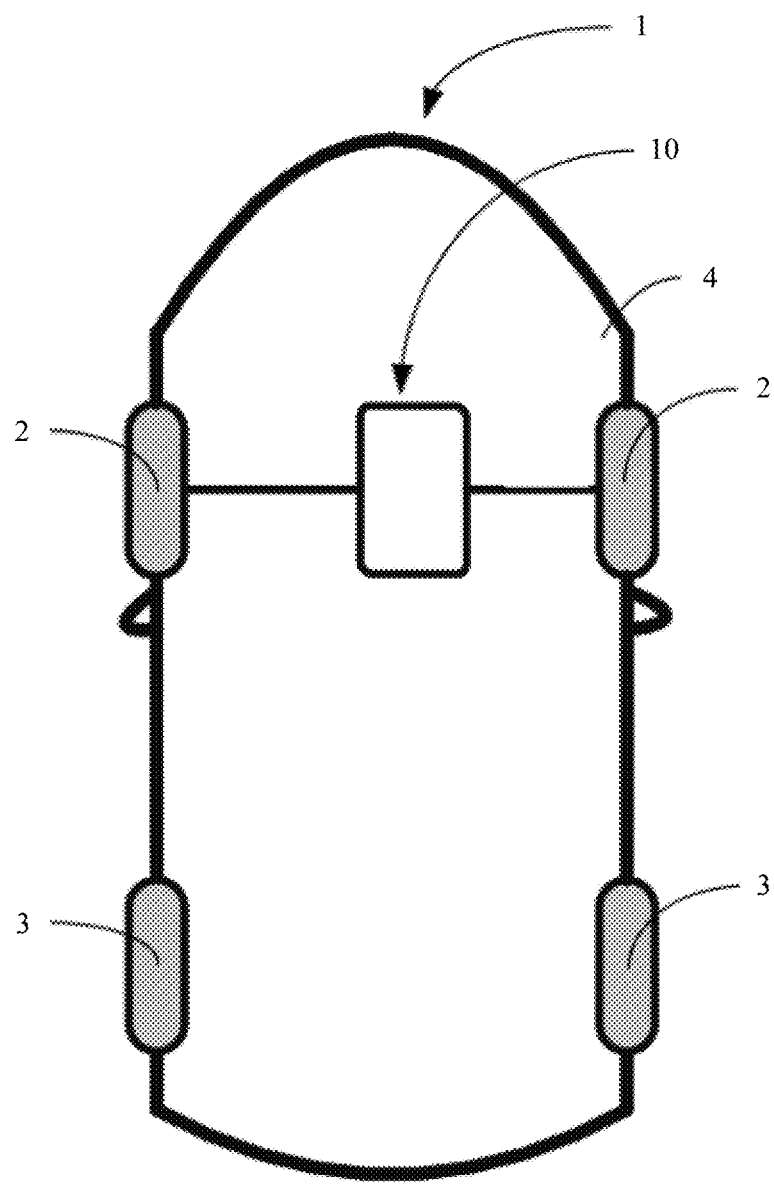
FIG. 23 is a schematic diagram of a structure of a vehicle according to an embodiment of this application.

With reference to FIG. 23, an embodiment of this application provides a vehicle 1. The vehicle 1 includes front wheels 2, rear wheels 3, a vehicle body 4 connected between the front wheels 2 and the rear wheels 3, and the two-speed transmission system 10 according to any one of the foregoing implementations. The two-speed transmission system 10 is installed on the vehicle body 4. The vehicle 1 includes a car, an electric vehicle, or a special working vehicle. The electric vehicle includes a two-wheel, three-wheel, or four-wheel electric vehicle. The special working vehicle includes various vehicles having specific functions, for example, an engineering emergency vehicle, a water spraying vehicle, a suction sewage truck, a cement mixer vehicle, a carriage hoist, and a medical vehicle.

The two-speed transmission system and the vehicle provided in embodiments of this application are described in detail above. The principles and the implementations of this application are described herein by using specific examples. The description about the foregoing embodiments is merely provided to help understand the method and core ideas of this application. In addition, a person of ordinary skill in the art can make variations and modifications in terms of the specific implementations and application scopes according to the ideas of this application. In conclusion, the content of this specification shall not be construed as a limitation to this application.

What is claimed is:

1. A two-speed transmission system, wherein the two-speed transmission system comprises:
    a first fixed gear, sleeved on a first shaft and fixedly connected to the first shaft;
    a first floating gear, sleeved on a second shaft, wherein the first floating gear is configured to rotate relative to the second shaft, and the first fixed gear and the first floating gear are permanently engaged;
    a first connection mechanism, fastened on the second shaft and configured to implement connection or disconnection between the first floating gear and the second shaft; and
    a one-way clutch, wherein the one-way clutch is located between the first floating gear and the first connection mechanism; an inner surface of the one-way clutch is connected to the first floating gear; an outer surface of the one-way clutch abuts against the first connection mechanism; based on the first floating gear rotating relative to the first connection mechanism in a rotation direction, the first floating gear and the first connection mechanism implement differential rotation using the one-way clutch; and based on the first floating gear rotating relative to the first connection mechanism in another rotation direction, the one-way clutch locks so that the first floating gear and the first connection mechanism are relatively static and rotate at a same rotation speed to transmit first-gear power;

wherein the first floating gear comprises a first floating transmission tooth surface and a first floating connection part, the first floating transmission tooth surface is disposed away from the second shaft relative to the first floating connection part, the first floating transmission tooth surface is configured to engage with the first fixed gear, the first floating connection part is configured to connect to the second shaft through rotation to connect the first floating gear to the second shaft through rotation, the first floating connection part comprises a first extension part extending in an axial direction of the second shaft, the inner surface of the one-way clutch is sleeved on a surface of the first extension part away from the second shaft and is fixedly connected to the first extension part, and the inner surface of the one-way clutch is connected to the first floating gear;

wherein the first connection mechanism comprises a gear hub fixedly connected to the second shaft, the gear hub comprises a gear hub connection part and a second extension part, the second extension part is disposed away from the second shaft relative to the gear hub connection part, the second extension part extends in an opposite direction of an extension direction of the first extension part, the second extension part is sleeved on the outer surface of the one-way clutch and abuts against the outer surface of the one-way clutch, and the outer surface of the one-way clutch abuts against the first connection mechanism;

wherein the first floating gear further comprises a first gear shift ring, and the first gear shift ring is configured to connect to or disconnect from the first connection mechanism; and wherein the first floating gear further comprises a first transmission connection part located between the first floating transmission tooth surface and the first floating connection part, the first transmission connection part is located at an end of the first floating connection part away from the first extension part, the first gear shift ring is located on the first transmission connection part, the first gear shift ring extends in the same direction as the first extension part, and an end of the first gear shift ring away from the first transmission connection part is connected to or disconnected from the first connection mechanism.

2. The two-speed transmission system according to claim 1, wherein the first connection mechanism further comprises a sliding mechanism and a shifting fork, the sliding mechanism is sleeved on an outer surface of the gear hub and is configured to slide in the axial direction of the second shaft, the shifting fork is connected to the sliding mechanism and is configured to control the sliding mechanism to move in the axial direction of the second shaft, the sliding mechanism comprises a second gear shift ring matching the first gear shift ring, and the first gear shift ring and the second gear shift ring are configured to be engaged or separated when the shifting fork slides in the axial direction of the second shaft, to implement connection and disconnection between the first connection mechanism and the first floating gear.

3. The two-speed transmission system according to claim 1, wherein
the first shaft is an input shaft, the second shaft is an intermediate shaft, the first fixed gear is a first driving gear, and the first floating gear is a first driven gear; or
the first shaft is an intermediate shaft, the second shaft is an input shaft, the first fixed gear is a first driven gear, and the first floating gear is a first driving gear.

4. The two-speed transmission system according to claim 1, wherein the two-speed transmission system further comprises:
a second fixed gear, sleeved on a fixed shaft and fixedly connected to the fixed shaft, wherein the fixed shaft is one of the first shaft and the second shaft;
a second floating gear, sleeved on a floating shaft, wherein the second floating gear is configured to rotate relative to the floating shaft, the second fixed gear and the second floating gear are permanently engaged, and the floating shaft is the other one of the first shaft and the second shaft; and
a second connection mechanism, fastened on the floating shaft and configured to implement connection or disconnection between the second floating gear and the floating shaft, wherein based on the second floating gear and the floating shaft being connected by the second connection mechanism, the second floating gear and the floating shaft rotate at a same rotation speed; and based on the second floating gear and the floating shaft being disconnected by the second connection mechanism, a rotation speed of the floating shaft is not controlled by the second floating gear.

5. The two-speed transmission system according to claim 4, wherein
the fixed shaft is the first shaft and is the input shaft, the floating shaft is the second shaft and is the intermediate shaft, the second fixed gear is a second driving gear, and the second floating gear is a second driven gear; or
the fixed shaft is the first shaft and is the intermediate shaft, the floating shaft is the second shaft and is the input shaft, the second fixed gear is a second driven gear, and the second floating gear is a second driving gear; or
the fixed shaft is the second shaft and is the intermediate shaft, the floating shaft is the first shaft and is the input shaft, the second fixed gear is a second driven gear, and the second floating gear is a second driving gear; or
the fixed shaft is the second shaft and is the input shaft, the floating shaft is the first shaft and is the intermediate shaft, the second fixed gear is a second driving gear, and the second floating gear is a second driven gear.

6. The two-speed transmission system according to claim 4, wherein the second floating gear comprises a second floating transmission gear part and a second floating hollow shaft, the second floating transmission gear part and the second fixed gear are engaged, the second floating hollow shaft is sleeved outside the floating shaft and is connected to the floating shaft through rotation, and the second connection mechanism is connected to the second floating hollow shaft.

7. The two-speed transmission system according to claim 6, wherein the second connection mechanism is a friction clutch, the friction clutch comprises a first rotation shaft interface, a second rotation interface, and a plurality of friction plates, the first rotation shaft interface is fixedly connected to an outer surface of the second floating hollow shaft away from the floating shaft, the second rotation interface is fixedly connected to the floating shaft, and the friction clutch controls connection and disconnection between the second floating gear and the floating shaft through connection and disconnection between the plurality of friction plates.

8. A vehicle, wherein the vehicle comprises front wheels, rear wheels, a vehicle body connected between the front wheels and the rear wheels, and a two-speed transmission system, wherein the two-speed transmission system comprises:
- a first fixed gear, sleeved on a first shaft and fixedly connected to the first shaft;
- a first floating gear, sleeved on a second shaft, wherein the first floating gear is configured to rotate relative to the second shaft, and the first fixed gear and the first floating gear are permanently engaged;
- a first connection mechanism, fastened on the second shaft and configured to implement connection or disconnection between the first floating gear and the second shaft; and
- a one-way clutch, wherein the one-way clutch is located between the first floating gear and the first connection mechanism; an inner surface of the one-way clutch is connected to the first floating gear; an outer surface of the one-way clutch abuts against the first connection mechanism; based on the first floating gear rotating relative to the first connection mechanism in a rotation direction, the first floating gear and the first connection mechanism are configured to implement differential rotation using the one-way clutch; and based on the first floating gear rotating relative to the first connection mechanism in another rotation direction, the one-way clutch is locked so that the first floating gear and the first connection mechanism are relatively static and rotate at a same rotation speed to transmit first-gear power;
- wherein the first floating gear comprises a first floating transmission tooth surface and a first floating connection part, the first floating transmission tooth surface is disposed away from the second shaft relative to the first floating connection part, the first floating transmission tooth surface is configured to engage with the first fixed gear, the first floating connection part is configured to connect to the second shaft through rotation to connect the first floating gear to the second shaft through rotation, the first floating connection part comprises a first extension part extending in an axial direction of the second shaft, the inner surface of the one-way clutch is sleeved on a surface of the first extension part away from the second shaft and is fixedly connected to the first extension part, and the inner surface of the one-way clutch is connected to the first floating gear;
- wherein the first connection mechanism comprises a gear hub fixedly connected to the second shaft, the gear hub comprises a gear hub connection part and a second extension part, the second extension part is disposed away from the second shaft relative to the gear hub connection part, the second extension part extends in an opposite direction of an extension direction of the first extension part, the second extension part is sleeved on the outer surface of the one-way clutch and abuts against the outer surface of the one-way clutch, and the outer surface of the one-way clutch abuts against the first connection mechanism;
- wherein the first floating gear further comprises a first gear shift ring, and the first gear shift ring is configured to connect to or disconnect from the first connection mechanism; and
- wherein the first floating gear further comprises a first transmission connection part located between the first floating transmission tooth surface and the first floating connection part, the first transmission connection part is located at an end of the first floating connection part away from the first extension part, the first gear shift ring is located on the first transmission connection part, the first gear shift ring extends in the same direction as the first extension part, and an end of the first gear shift ring away from the first transmission connection part is connected to or disconnected from the first connection mechanism.

* * * * *